US011210833B1

(12) United States Patent
Daviet

(10) Patent No.: US 11,210,833 B1
(45) Date of Patent: Dec. 28, 2021

(54) METHOD FOR COMPUTING FRICTIONAL CONTACTS OF TOPOLOGICALLY DIFFERENT BODIES IN A GRAPHICAL SYSTEM

(71) Applicant: Weta Digital Limited, Wellington (NZ)

(72) Inventor: Gilles Daviet, Mûres (FR)

(73) Assignee: Weta Digital Limited, Wellington (NZ)

( * ) Notice: Subject to any disclaimer, the term of this patent is extended or adjusted under 35 U.S.C. 154(b) by 0 days.

(21) Appl. No.: 17/186,705

(22) Filed: Feb. 26, 2021

Related U.S. Application Data

(60) Provisional application No. 63/045,016, filed on Jun. 26, 2020.

(51) Int. Cl.
*G06T 13/20* (2011.01)
*G06T 17/20* (2006.01)

(52) U.S. Cl.
CPC .............. *G06T 13/20* (2013.01); *G06T 17/20* (2013.01); *G06T 2210/21* (2013.01)

(58) Field of Classification Search
CPC ..... G06T 13/20; G06T 17/20; G06T 2210/21; G06T 2210/16; G06T 13/00–80
See application file for complete search history.

(56) References Cited

U.S. PATENT DOCUMENTS

| | | | | |
|---|---|---|---|---|
| 2004/0227761 | A1* | 11/2004 | Anderson | G06T 13/40 345/473 |
| 2014/0198107 | A1* | 7/2014 | Thomaszewski | G06T 13/40 345/473 |
| 2017/0098327 | A1* | 4/2017 | Gornowicz | G06T 13/40 |
| 2019/0228123 | A1* | 7/2019 | Taylor | G06F 30/23 |
| 2020/0125688 | A1* | 4/2020 | Peiret Gimenez | G06F 30/28 |

OTHER PUBLICATIONS

Li, Jie, et al. "An implicit frictional contact solver for adaptive cloth simulation." ACM Transactions on Graphics (TOG) 37.4 (2018): 1-15. (Year: 2018).*
Daviet, Gilles, Florence Bertails-Descoubes, and Laurence Boissieux. "A hybrid iterative solver for robustly capturing coulomb friction in hair dynamics." Proceedings of the 2011 SIGGRAPH Asia Conference. 2011. (Year: 2011).*
Nphysics Contact Models User Guide, https://physics.org/contact_models/.
International Search Report and Written Opinion for PCT/NZ2021/050070 dated Sep. 29, 2021.
Brown, et al. "Accurate dissipative forces in optimization integrators," ACM Transactions on Graphics, ACM, NY, US, vol. 37, No. 6, Dec. 4, 2018 (Dec. 4, 2018), pp. 1-14, XP058464720, ISSN: 0730-0301, DOI: 10.1145/3272127.3275011.

(Continued)

*Primary Examiner* — Daniel F Hajnik
(74) *Attorney, Agent, or Firm* — Haynes and Boone, LLP; Philip H. Albert

(57) ABSTRACT

Some embodiments of the present disclosure disclose systems and methods for computing frictional contacts of topologically different bodies in a graphical system. For a large number of fibers interacting, such as hair, interacting with one or more other bodies having different properties, the problem may be decomposed into an elastic relaxation part and a contact projection part, which may be solved to yield velocities for portions of objects, providing efficient, realistic interactions.

17 Claims, 23 Drawing Sheets

(56) References Cited

OTHER PUBLICATIONS

Daviet, Gilles, "Simple and scalable frictional contacts for thin nodal objects," ACM Transactions on Graphics, ACM, NY, US, vol. 39, No. 4, Jul. 8, 2020 (Jul. 8, 2020), pp. 61:1-61:16, XP058458636, ISSN: 0730-0301, DOI: 10.1145/3386569.3392439.
Overby et al., "ADMM Projective Dynamics: Fast Simulation of Hyperelastic Models with Dynamic Constraints," IEEE Transactions on Visualization and Computer Graphics, IEEE Service Center, Los Alamitos, CA, US, vol. 23, No. 10., Oct. 1, 2017 (Oct. 1, 2017), pp. 2222-2234, XP011659766, ISSN: 1077-2626, DOI: 10.1109/TVCG.2017.2730875.

* cited by examiner

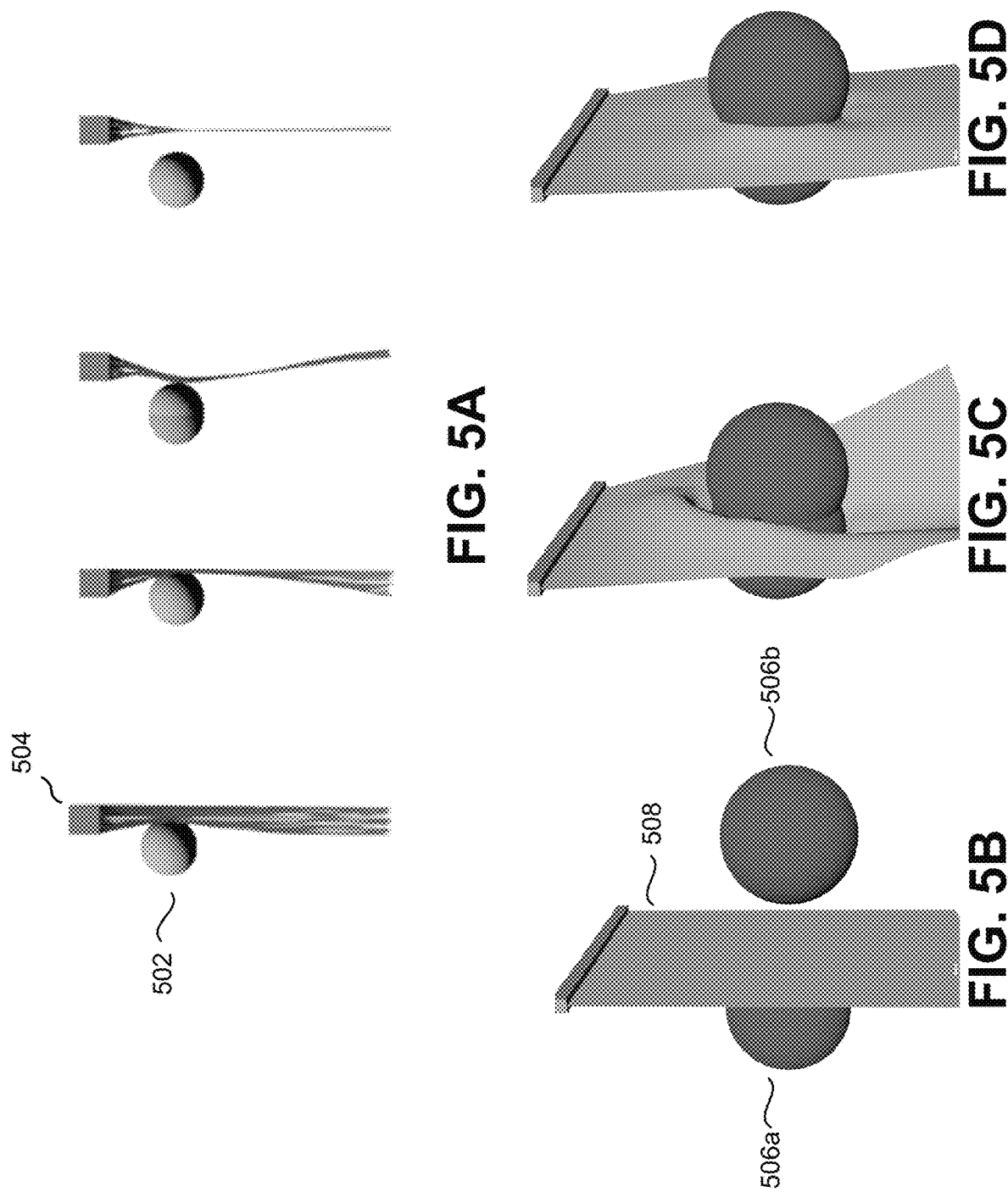

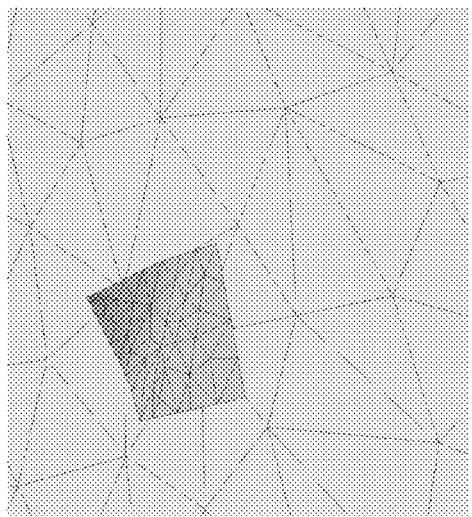
FIG. 7A
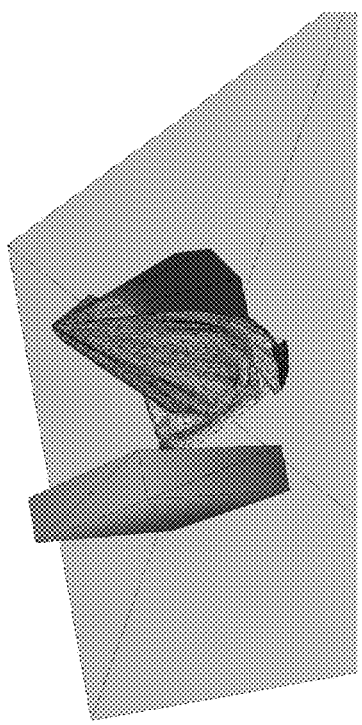
FIG. 7B
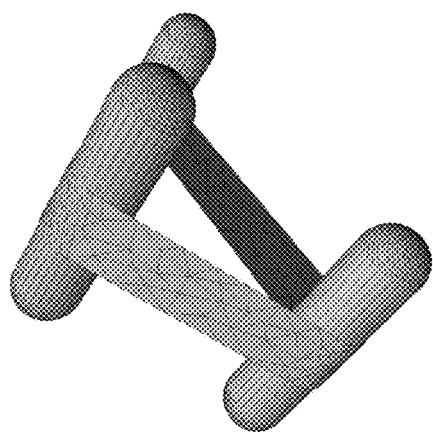
FIG. 7C
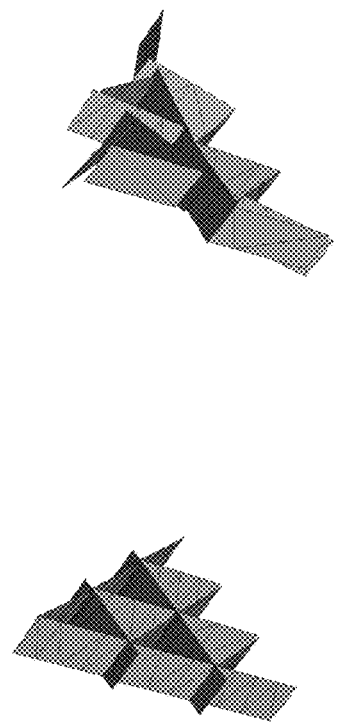
FIG. 7D
FIG. 7E

1100

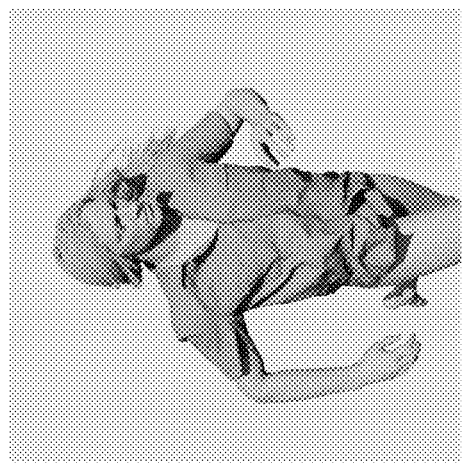
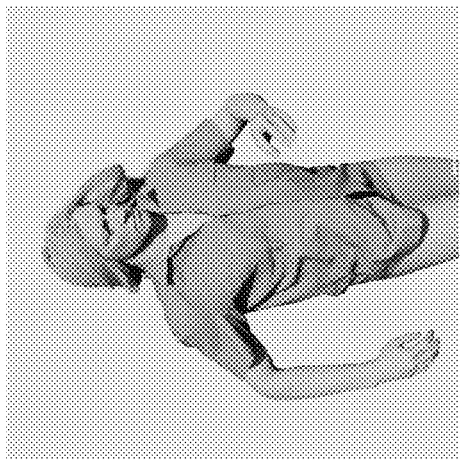
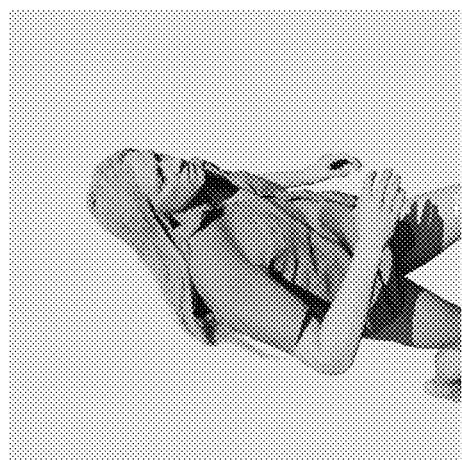
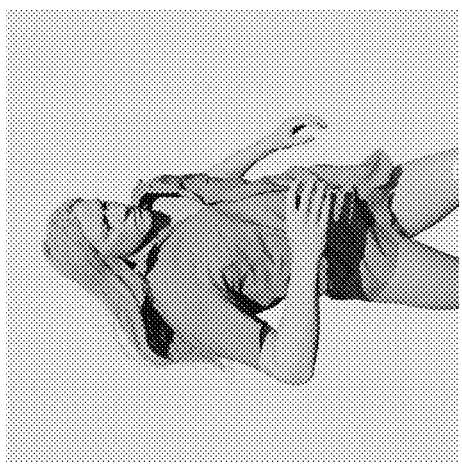
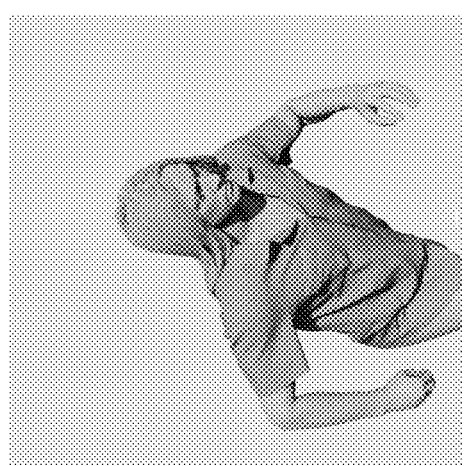
FIG. 13

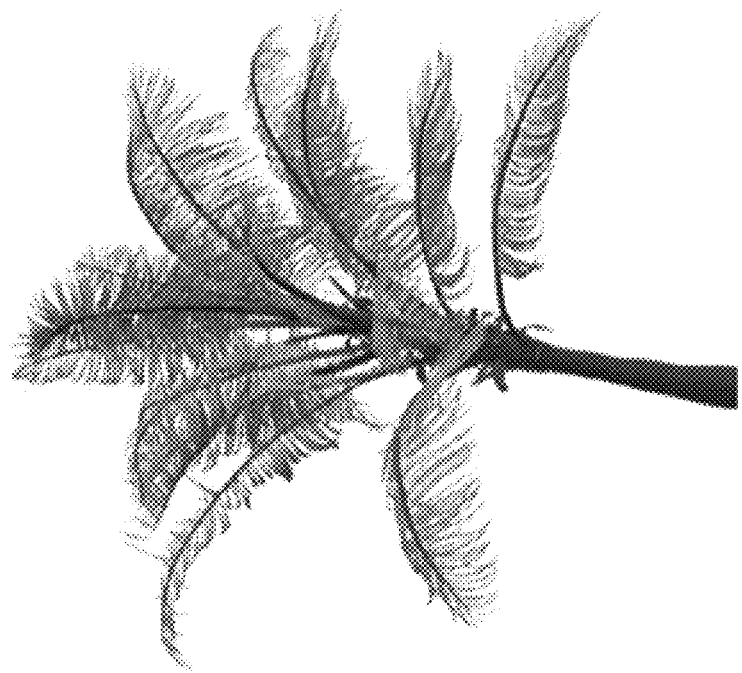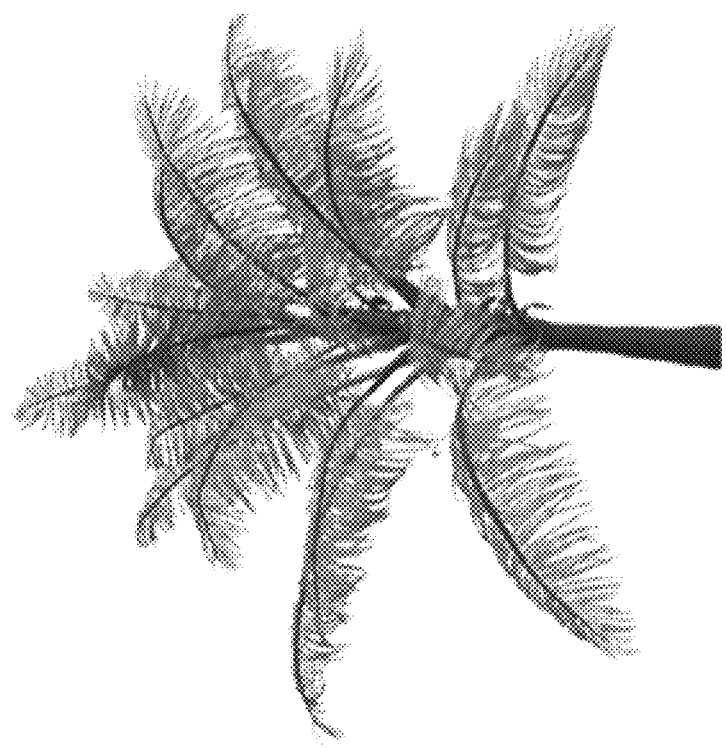
FIG. 14

METHOD FOR COMPUTING FRICTIONAL CONTACTS OF TOPOLOGICALLY DIFFERENT BODIES IN A GRAPHICAL SYSTEM

CROSS-REFERENCE TO RELATED APPLICATIONS

The present application claims priority to and the benefit of the U.S. Provisional Patent Application No. 63/047,220, filed Jul. 1, 2020, titled "Method for Computing Frictional Contacts of Topologically Different Bodies in a Graphical System," the disclosure of which is hereby incorporated by reference herein in its entirety.

FIELD

The present disclosure relates generally to methods and systems for generating realistic computer-animated interactions between multiple physical bodies having different properties, such as hair interacting with cloth or flesh, and particularly to apparatus and techniques for decomposing many frictional contacts into an elastic relaxation problem and a contact projection problem.

BACKGROUND

Viewers demand continuously increasing visual richness of virtual environments in computer animated scenes, which has led game and movie creators to turn to physical simulations to create realistic interactions between objects, such as by using a physics engine to output movements of objects that are consistent with real-world scenarios. In some cases, such efforts are directed to determining natural-looking movements of a few rigid objects. For other simulations, such as those with many flexible objects, such as hair or other fibers, the number of degrees of freedom of individual objects or portions of objects is much greater, and typical computer simulations require a trade-off between realism, resolution, and amount of computing resources available. Because of this trade-off, efficient computer simulation techniques can be important as they might allow for an increase in realism and/or resolution without requiring significant increases in computing resources. Simulation computations involving frictional contacts and other contact interactions can often involve such trade-offs.

SUMMARY

Some embodiments of the present disclosure disclose methods and systems for generating realistic computer-animated interactions between multiple physical bodies having different properties. In some embodiments, a computer-implemented method might comprise receiving a representation of a plurality of virtual objects of a model, the plurality of objects comprising a first interacting object and a second interacting object, receiving a first degree of freedom associated with the first interacting object, receiving a second degree of freedom associated with the second interacting object, computing an initial condition using the first degree of and second degree of freedom, detecting, using the initial condition, a set of contact points between the first interacting object and the second interacting object, the set of contact points comprising one or more contact points, computing a resultant relative velocity between the first interacting object and second interacting object, given the first degree of freedom and the second degree of freedom by performing at least one iteration of: (1) computing an updated first relative velocity by minimizing an elastic relaxation energy of the model using a previously computed second velocity and a previously computed error term, (2) computing an updated second relative velocity by minimizing a frictional contact projection using the set of contact points and the updated first relative velocity and the previously computed error term, (3) updating the previously computed error term to produce an updated error term, and thereafter computing the resultant relative velocity based on at least one of the updated first relative velocity and the updated second relative velocity.

The first interacting object and/or the second interacting object might comprise tessellated meshes, might represent soft bodies, and/or might have other characteristics. The first interacting object and the second interacting object might be portions of a larger object, such as where the first interacting object is one portion of a hand, character, cloth, etc. and the second interacting object is a different portion of the hand, character, cloth, etc. The frictional contact projection might correspond to a frictional displacement based on a normal portion and a tangential portion of the second relative velocity at the one or more contact points. An interacting object of the plurality of virtual objects might have associated degrees of freedom including a velocity and a force. Detecting the set of contact points might comprise computing a proximity of the first interacting object and the second interacting object. The set of contact points might be a single contact point. The contact point might be updated as other values are updated in various iterations.

Computing the resultant relative velocity might comprise assigning the resultant relative velocity a value of the at least one of the updated first relative velocity and the updated second relative velocity from a final iteration of computing the resultant relative velocity.

The method might further comprise linearizing the model to obtain a symmetric operator approximating a square matrix of second-order partial derivatives representing a total energy of the interacting model, from the symmetric operator, computing a diagonal stiffness matrix, computing a linear solver preconditioner based on the diagonal stiffness matrix and the symmetric operator, computing the updated first relative velocity by minimizing the elastic relaxation energy using the linear solver preconditioner.

The updated error term might be computed using an alternating directions method of multipliers.

The method might be implemented using a non-transitory computer-readable storage medium storing instructions, which when executed by at least one processor of a computer system, causes the computer system to carry out the computer-implemented method.

A computer-implemented method might comprise obtaining a model, wherein the model includes degrees of freedom of a plurality of simulated dynamic objects encoded in a plurality of positions in the model, detecting proximity and collisions in the model, linearizing the model to obtain a symmetric operator approximating a square matrix of second-order partial derivatives representing a total energy of the model, from the symmetric operator, computing a diagonal stiffness matrix, computing a linear solver preconditioner based on the diagonal stiffness matrix and the symmetric operator, performing at least one iteration of: 1) iteratively updating a first velocity by conducting a first series of iterations to solve an elastic relaxation model to form an updated first velocity, 2) iteratively updating a second velocity by conducting a second series of iterations to solve a frictional contact projection to form an updated second velocity, 3) updating an error term computed from the first velocity and the second velocity, and thereafter computing, based on at least one of the first velocity and second velocity, a resultant velocity.

Iteratively updating the first velocity to solve the elastic relaxation model might comprise determining an exit criterion, concluding iterations of updating if the exit criterion is met, computing an interim velocity using the linear solver preconditioner by solving an elastic relaxation problem based on the symmetric operator, the diagonal stiffness matrix, and a previously computed second velocity, updating the second velocity to the updated second velocity based on the interim velocity and the error term. The exit criterion might correspond to a number of iterations being equal to or greater than a predetermined maximum number of iterations. The exit criterion might correspond to the updated first velocity being approximately equal to the first velocity and the updated second velocity being approximately equal to the second velocity. Iteratively updating the second velocity to solve the frictional contact projection might comprise detecting a plurality of contacts in the model, for a given contact of the plurality of contacts, computing the interim velocity based on a previously computed first velocity and the error term, for the given contact, computing a frictional displacement based on the interim velocity and the diagonal stiffness matrix, producing a plurality of frictional displacements, applying the plurality of frictional displacements to the frictional contact projection to update the second velocity.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Various embodiments in accordance with the present disclosure will be described with reference to the drawings, in which:

FIGS. 5A-5D illustrates an animated sphere contacting a bundle of sticky fibers, according to some embodiments of the present disclosure.

FIGS. 7A-7E illustrate frictional effects on a stretched conveyor belt, a piece of cloth dragged on a plane, a first house of cards, a second house of cards with different frictional forces from the first, and another cloth draping a box and a cone, according to some embodiments of the present disclosure.

FIG. 13 illustrates a character with a shirt and a long hairstyle going through a running motion, according to some embodiments of the present disclosure.

FIG. 14 illustrates a palm tree wafting in a fresh breeze, according to some embodiments of the present disclosure.

FIG. 17 illustrates performance of an implementation of an embodiment for volumetric objects, according to some embodiments of the present disclosure.

DETAILED DESCRIPTION

Figure 1:
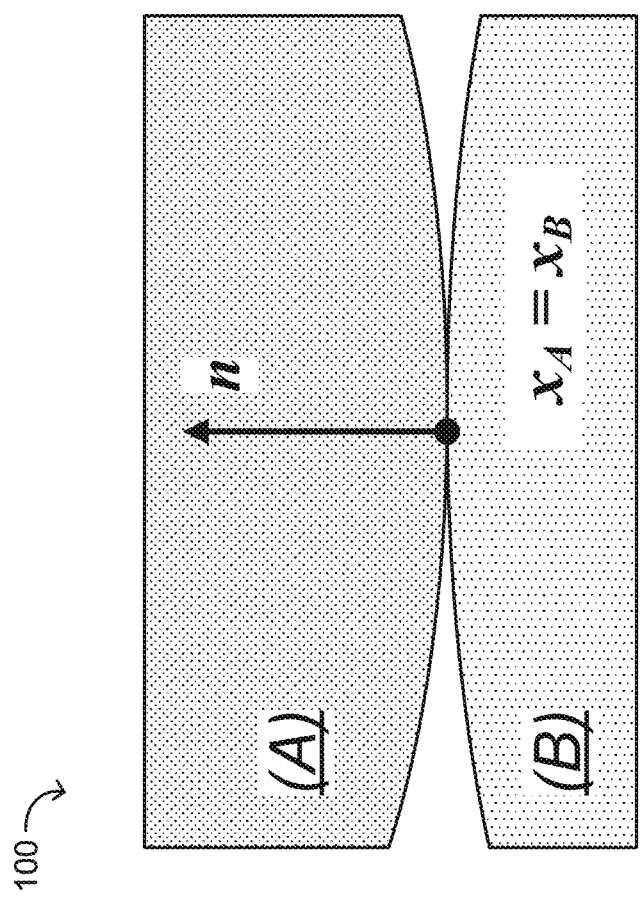
FIG. 1 is a diagram of a normal between two bodies in contact, according to some embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The simulation of multiple flexible objects, such as hair or other fibers, can be computationally expensive and highly challenging, primarily because of the large number of degrees of freedom of the individual objects or portions of objects. For example, a higher spatial resolution may be used to smoothly capture ultra-high resolution interaction of fibers (such as hair) than may be typically used if hair were modeled as one large "wig" or "groom" which did not move as it interacted with the environment. When a visual effects ("VFX") shot requires hair to move and interact with other objects realistically, the computing resources that may be used to generate the hair can exceed those available. The performance of some methods or algorithms that handle collisions in elastic bodies such as cloth and fibers may degrade when applied to objects with different topologies or constitutive models, such as when the fibers interact with a larger body such as cloth. Some algorithms may not scale to a high-enough number of contacting points to allow for realistic simulation of the number of fibers required in hair or a furry animal.

Frictional contacts are the primary way by which physical bodies interact, yet dry friction poses many numerical challenges, particularly when physical bodies having different properties come in contact, for example hair colliding with cloth.

The continuously increasing demand for visual richness of virtual environments has prompted the use of physical simulation to generate an ever larger portion of the final rendered frames. While the dynamics of the various objects that compose virtual environments can in themselves be of great interest, a large part of the visual complexity of their shape and motion can be attributed to the interactions that they have with surrounding components. In many cases, these interactions take the form of contact with dry friction. Consider examples as diverse as a granular material, the leaves of a tree gently colliding under a breeze, or hair strands subtly entangled with neighboring fibers, themselves lying upon layers of cloth and eventually skin.

Yet, simulation of dry friction can be numerically or computationally challenging, in particular approaches that aim to efficiently handle these various object topologies and interactions in a unified manner. Some methods treat collisions between a very high number of "simple" components, such as granular materials, rigid bodies, or fiber assemblies, or at the other end of the spectrum a more reasonable number of large deformable bodies, such as flesh or cloth. Another dichotomy has also often been made between volumetric and thin objects, as slight amounts of inter-penetration can be tolerated for the former, but would immediately lead to hard-to-recover-from artefacts for the latter.

In the fashion of molecular dynamics, the first methods developed in mechanics and Computer Graphics suggested resolving contacts through the application of penalties, repulsive forces of intensity proportional to the inter-penetration depth of the colliding bodies. An implicit integration scheme for elastic and collision energies that alleviated the drastic timestep restrictions imposed by the explicit application stiff penalties can be applied, but this approach remained subject to excessive numerical dissipation and sticking artefacts. In some cases, a stiffly accurate integrator can be utilized to address this problem. Traditionally, the frictional component of penalty forces is defined as proportional to the sliding velocity, but this may not allow modeling dry friction, where non-zero friction can exist at rest. This limitation can be addressed through the use of frictional anchors that are continuously updated as to locally satisfy Coulomb law.

Even with implicit treatment, finite penalties may not prevent tunneling for arbitrary colliding momenta. This is especially problematic for thin objects like cloth. To this end, augmenting penalties with an end-of-step geometric correction scheme that iteratively moves vertices to resolve collisions can be applied, with falls back to a rigid-impact-zone failsafe if a valid position cannot be found. In some instances, this failsafe may be relaxed to allow sliding at impact zones, but this approach may still fail to accurately model dry friction. These corrective approaches may also ignore internal elasticity of the dynamic objects, potentially leading to large stresses after resolution.

In some cases, implicit constraint-based contacts may be applied for the proper treatment of dry friction. For example, impulses can be used to resolve impacts in a time-stepping integrator. Inequality constraints and linear complementarity may be used to model unilateral contacts.

In some instances, 3D contact dynamics with Coulomb friction may be solved by applying the Newton method to find the roots of a nonsmooth complementarity function. This algorithm may be used to simulate fiber assemblies, but convergence can be hard to achieve for high ratios of contacts to degrees of freedom (DoF). Other suitable, slightly smoother complementarity functions can also be used. A Newton algorithm may be used to iteratively approximate complementarity functions as quadratic constraints, yielding linear systems that can be efficiently solved through the Conjugate Residual method and demonstrating much more robust convergence. Newton algorithms can also be employed inside Interior Point solvers to solve an approximate version of the Coulomb law, the so-called associated friction law. A fixed-point algorithm may also be used to reduce exact Coulomb friction to several instances of the associated law.

The theoretical quadratic rate of convergence of Newton and Interior Points methods is attractive for medium-scale contact dynamics problems to have high accuracy. However, a new linear system may be solved at each iteration, and warmstarting interior point solvers can be difficult. In some cases, first-order methods may be used for large scale visual applications.

In some instances, contacts may be solved sequentially one-by-one until convergence is achieved for the whole system. Applying the Newton algorithm to single contacts multiple times can be both more robust and more efficient than applying the method to all contacts at once. Gauss-Seidel-like algorithms can be used but only to treat the frictionless case or linearized friction laws. An analytical enumerative solver for the one-contact problem with exact Coulomb friction can be combined with a complementarity function to solve the dynamics of a few thousands Super-Helices. Further, a non-linear elasticity solver can be used to robustly simulate frictional contacts in assemblies of up to 64 k Discrete Elastic Rods.

Operator-splitting algorithms can display satisfying scaling behaviour for dynamical systems having many small objects, like hair fibers or rigid bodies. However, they may either explicitly assemble or back-solve many times the so-called Delassus operator, making them unattractive for the simulation of larger elastic bodies, like cloth or muscles.

For such fully-connected bodies, the Delassus operator is indeed generally dense, with a number of rows and columns corresponding to the total number of contacts, leading to intractable or near intractable memory and/or computational costs. One approach to this problem is adding another level of operator-splitting, propagating the elastic strains in a second loop on top of the contact solver. Another approach is to avoid the use of the Delassus operator by expressing the constrained dynamics on the primal velocity variable rather than the dual forces. However, this transformation may be achieved by placing stringent assumptions on the contact configuration.

While robust, operator-splitting solvers suffer from poor (e.g., logarithmic) theoretical convergence, asymptotically faster solvers based on variants of the Projected Gradient algorithm can be applied. Derived from convex optimization theory, these methods target the associated version of the Coulomb law. One major advantage is that the method solve by the Delassus operator once per iteration, and thus remain tractable for large elastic bodies. Moreover, the constraint projection step can be parallelized. However, the projection being performed on the force variable means that feasibility of the velocity iteration may not be enforced until full convergence of the algorithm. In contrast, primal-dual descent methods, such as the Alternating Directions Method of Multipliers (ADMM) deriving from Augmented Lagrangian formalism, can perform the projection on the primal velocity variable, facilitating its feasibility. Such methods can be applied to single vortices in contact dynamics, and in some cases may suffer from hard-to-tune convergence parameters. In some instances, Krylov-subspace descent methods, which, in some cases, may handle, in theory, linear constraints only, may be used to emulate the true quadratic friction cone by progressively updating the friction direction to match the relative velocity.

In some instances, position-based dynamics (PBD) can be applied to approximate physics-based animations with robust handling of frictional contacts for real-time applications. Some PBD methods can be highly dependent on non-physical parameters such as number of iterations, while others, such as X-PBD, may allow convergence to a proper dynamical equilibrium. However, since constraints are solved in a Gauss-Seidel fashion, strains may only be propagated to the neighbouring particles at each iteration. For long chains of particles, achieving convergence may take a long time, and in some cases, prohibitively so.

In some instances, continuum methods may be applied to the treatment of contact dynamics between elastic bodies—which is especially justified when the typical size of the objects heterogeneities is small compared to the simulation resolution. This may be applied to the simulation of hair dynamics. The granular Drucker-Prager rheology may be adapted to the simulation of thin 1D and 2D objects. While the background grid used in continuum approaches supplants proximity detection and prevents intersections "for free," precise collision resolution may use a fine grid and thus tight timestep restrictions. To alleviate this issue, hybrid methods augmenting coarse continuum simulations with discrete collision resolution may be applied. The natural collision resolution granted by the background velocity field also tends to average-out high-frequency velocity gradients, hindering subtle changes in local topology.

Accordingly, embodiments of the present disclosure disclose methods and systems that allow for generating realistic computer-animated interactions between multiple physical bodies having different properties, such as but not limited to hair interacting with cloth or flesh. Such methods and systems may not be limited to hairs, but could apply to any large set of like elements interacting with one or more neighboring components. A prototypical example is hair strands interacting with cloth or muscle, but it should be understood that the methods and systems can be applied to any collection of a large number of small objects that interact with large elastic objects. The methods and systems may also allow for at least limiting tunneling to avoid artefacts when simulating hair or other thin, two sided objects striking a larger object.

A simulation of the interaction of multiple physical bodies having different properties can be decomposed into two parts: (1) an elastic relaxation part, and (2) a contact projection part. The problems or parts may then be solved to yield velocities for each vertex that are within an acceptable margin. A matrix-free Gauss-Seidel solver enforces hard contact constraints with Coulomb friction at the velocity level.

A set of dynamic objects, many of them small but also including a few larger objects may be simulated. Each object comprises a set of points having coordinates in the number of degrees of freedom, for example three coordinates for a point in three-dimensional (3D) space. The points may also have non "position-like" degrees of freedom. An optional kinematic term may be included.

Given a set of dynamic objects, their movement is simulated as a series of time steps. As the objects move through space (their degrees of freedom), they come into contact with each other. For any two objects, a gap function measures the distance between the points of the objects, including their kinematic components. When the gap is zero, a graphical system can compute a normal vector and a tangent vector from the contact point, which may be used to model the contact force applied by one object on another. Furthermore, when solving, the graphical system may constrain the gap function to be greater than or equal to zero to ensure the objects do not penetrate each other.

From time step to time step, velocity may be calculated using conservation of momentum, which has as terms mass as well as elastic and dissipation potentials. The momentum equation may be broken into a series of elastic relaxation problems and a frictional contact projection. These problems can then be solved numerically.

Overview

In some embodiments, a method provides a scalable approach for the numerical simulation of hard contacts with exact Coulomb friction for a large class of dynamical objects. This method can handle both large flexible objects, such as the garments of a character or flesh, and tens of thousands of fibers (such as hair or fur), amounting to millions of degrees of freedom and contact points. The method provides a unified approach, capable of handling a large class of dynamical objects, that can solve for millions of contacts with exact Coulomb friction while keeping computation time and memory usage reasonable. This method allows seamless coupling between the various simulated components that comprise virtual characters and their environment. Some embodiments allow integration of popular time integrators such as Projected Newton or ADMM.

Some embodiments provide a frictional contact solver able to handle at the same time a large amount of small objects like hair strands, and large elastic objects like cloth or muscles, with as few as possible restrictions on the choice of discretization and constitutive models. Furthermore, embodiments can deal with thin, two-sided objects, and therefore lower (e.g. minimize) or prevent tunneling. This may be accomplished by enforcing strict feasibility of the objects' velocities. The method is also highly scalable, up to millions of contact points. Visual applications can benefit from at least moderate accuracy of the contact forces, keeping first-order methods relevant, though the method is precise enough for the simulation to remain stable and properly capture the characteristic behavior of Coulomb friction. Finally, the method's results depend as little as possible on non-physical parameters such as iteration numbers.

In some embodiments, the method decomposes the problem into an elastic relaxation part and a contact projection part, and alternates between solving the two. The method uses a feasibility constraint enforced with a Gauss-Seidel algorithm and uses an analytical local solver on the primal velocity variable, yielding an implementation with fixed mathematical properties. The method may avoid computing the actual local contact forces. Some embodiments use only the resulting forces at the degrees of freedom. Moreover, the projection scheme of the method takes into account elastic stiffness, and allows for that unbiased Coulomb friction to be satisfied for arbitrary contact points, though a faceted approximation with a friction update can be contemplated. For the elastic relaxation step, the method solves penalized linear systems using the Conjugate Gradient method, allowing fast, global propagation of the strain updates. The left-hand-side of these linear systems can remain constant across iterations, permitting the use of an efficient preconditioner. Using Gauss-Seidel for contacts but a global linear solve for elastic relaxation is well suited to simulations in which the length of fully-connected degrees of freedom (DoF) chains is greater than the number of densely-packed contacting layers, though the method works well for other types of interactions.

In some embodiments, decomposition of the problem into elastic relaxation and contact projection part can be achieved through the ADMM formalism. The collision constraint is presented as a single term rather than a per-contact energy, but the method tolerates arbitrary contact configurations.

Notable features include making use of the derivation of an iterative algorithm based on the ADMM framework for splitting the frictional contact dynamics problem into two sub-problems that are amenable to solving individually. This algorithm is non-intrusive, can handle a large class of deformable objects, and can be plugged into standard nonlinear solvers such as Projected Newton. Another feature is a matrix-free Gauss-Seidel solver for enforcing hard contact constraints with exact Coulomb friction at the velocity level that is both highly scalable and can be implemented with ease. There are other relevant features disclosed, such as various optional extensions for these methods, including handling cohesion and contact compliance.

Dynamic Simulation Context

A model of the physical bodies is one input to the method. Some assumptions about that model may be made to allow optimizations to the method. Let q in $\mathbb{R}^m$ denote the concatenated vector of all degrees of freedom of a set of dynamic objects, and $v := \dot{q}$ their time derivative. A possible simplifying assumption on the discretization that may allow for a more efficient treatment of collisions, referred to as Assumption 1, which is that for any point belonging to a dynamic object, it is assumed that its position $x(t) \in \mathbb{R}^3$ can be expressed as a linear combination of 3D degrees of freedom. This may be stated as the below assumption, with $b_j(x) \in \mathbb{R}$, $q_j(t) \in \mathbb{R}^3$, and $\underline{x}(t) \in \mathbb{R}^3$ an optional kinematic term:

$x(t) = \Sigma_j b_j(x) q_j(t) + \underline{x}(t),$ (Assumption 1).

Objects may have non "position-like" degrees of freedom (DoF) as long as such DoF do not take part in the computation of the position of potential colliding points.

The class of objects that satisfy Assumption 1 includes nodal systems—whose degrees of freedom are vertices of a mesh, many FEM basis functions; higher-order interpolation schemes or frame-based models; and even partially-reduced models such as discrete elastic rods, with a contemplated simplification of an infinitely thin centerline. Rigid-bodies and reduced-coordinates models may be used outside of the method and are contemplated as extensions, though can create challenges to incorporate into the method as rotational DoF are less supported.

Time is modeled as a finite timestep $[t, t+\Delta_t]$. Begin-of-step quantities use the superscript $^t$ (e.g. $q_j^t$). Since the method focuses on implicit integration, superscripts for end-of-step values are omitted for concise notation. For instance, integrated velocities over the timestep are denoted as $q = q^t + \Delta_t v$.

Contact Modeling

For a contact between point $x_{c,A}$ of body (A) and point $x_{c,B}$ of body (B), $n_c$ denotes the contact normal pointing from (B) to (A), $r_c$ the contact force applied by object (B) onto object (A), and $h_c$ the position gap, $h_c := x_{c,A} - x_{c,B}$, as shown in diagram 100 of FIG. 1. For a 3D vector, z, defined at the contact point, the normal part might herein be denoted by $z_N$ where $z_N := z \cdot n_c$ and the tangential part might herein be denoted by $z_T$ where $z_T := z - z_N n_c$.

From Assumption 1, the gap function $h_c$ can be expressed as a linear combination of 3D DoF as:

$$h_c(t) = \Sigma_{j \in \mathbb{J}_c} b_{c,j} q_j(t) \underline{h}_c(t) \qquad \text{(Eqn A1)}$$

where $\mathbb{J}_c$ is the subset of node indices for which $b_{c,j} \neq 0$ and $\underline{h}_c$ encompasses kinematic components, including for instance the motion of scripted colliders.

For brevity of notation and when there are no ambiguities, the remainder of this specification will drop the c subscript when referring to quantities defined at any given contact and upright letters refer to the concatenated vector of values at all contact points, e.g. $u = (u_c)_{c \geq 0}$. In particular, gathering all $b_{c,j}$ coefficients in the sparse matrix B allows the linear relationship between h and q to be written as $h = Bq + \underline{h}$.

The time derivative of the gap, $\dot{h}$, gives the relative velocity between the contacting points. For convenience, in the discrete-time setting, a slightly offset definition of the relative velocity may be used:

$$u := \dot{h} + \frac{1}{\Delta_t} h_N^t n. \qquad \text{(Eqn. A2)}$$

As implicit integration gives $h = \dot{h} + \Delta_t h^t$, this definition of u ensures $h_N = \Delta_t u_N$, meaning that the no-interpenetration condition of contact points $h_N \geq 0$ can be written equivalently at the velocity level simply as $u_N \geq 0$. Note that this definition offsets the normal part of u, and the tangential part still coincides with the "physical" relative velocity.

Finally, the normal offset is included in an all-encompassing kinematic velocity term $$k := \underline{\dot{h}} + \frac{1}{\Delta_t} h_N^t n,$$

so that a relative velocity u can be expressed from the DoF velocities as:

$$u = \sum_{j \in J} b_{cj} v_j, \quad \text{(Eqn. A3)}$$

or more compactly in matrix form as u=Bv+k.

Friction

The Signorini condition expresses that interpenetration should be prevented and $u_N$ remain greater than or equal to 0, and that the contact force should be positive and non-zero only if the two points are actually in contact, such as when $u_N$=0. All those conditions can be written concisely using complementarity notation as:

$$0 \leq u_N \perp r_N \geq 0. \quad \text{(Condition 1)}.$$

Coulomb friction dictates that the friction force $r_T$ must be opposed to the tangential relative velocity $u_T$, and bounded by the friction coefficient μ times the normal contact force $r_N$. That is, the contact force must belong to the second-order cone of aperture μ, $K_\mu := \{\|r_T\| \leq \mu r_N, r \in \mathbb{R}^3\}$. Moreover, there can only be relative motion once the friction force becomes saturated in that it reaches the boundary of $K_\mu$. Formally, those conditions can be expressed as:

$$\begin{cases} r \in K_\mu \\ r_T = -\mu r_N \dfrac{u_T}{\|u_T\|} \text{ if } u_T \neq 0. \end{cases} \quad \text{(Condition 2)}$$

Figure 2:
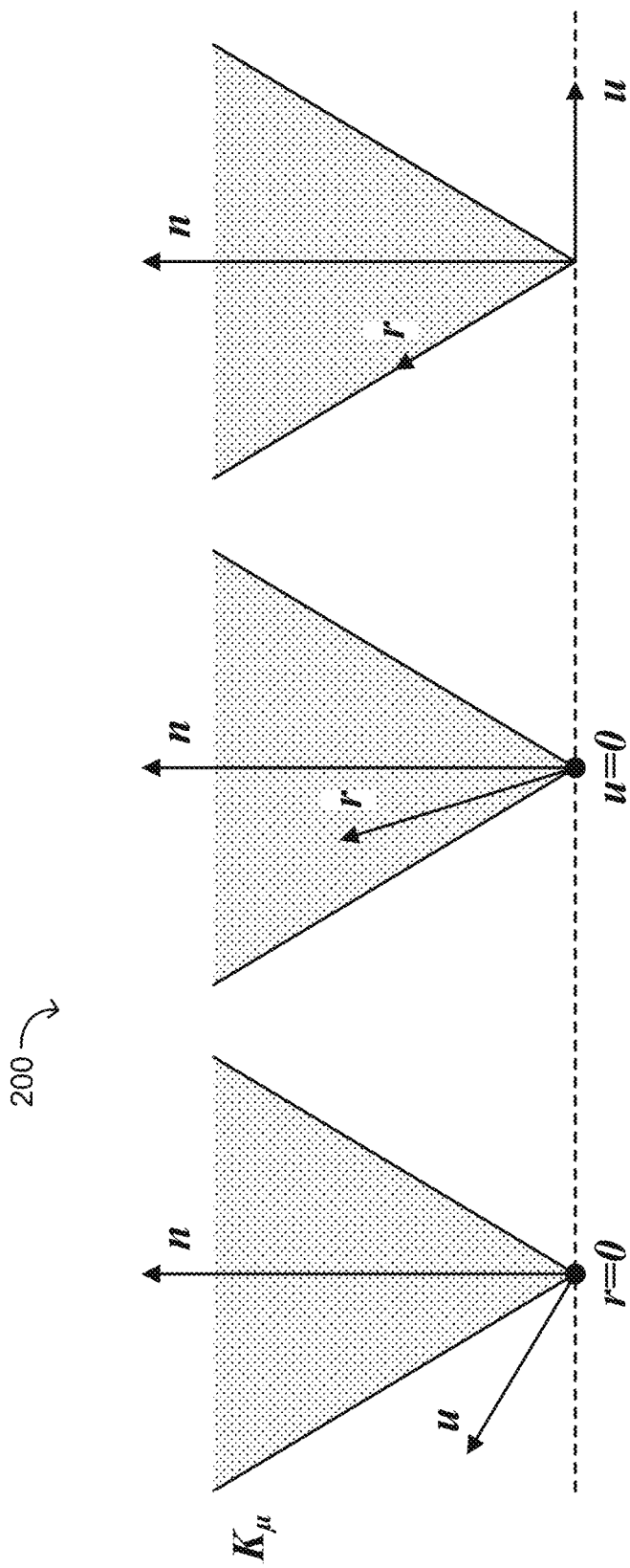
FIG. 2 illustrates possible cases of the Signorini-Coulomb conditions, according to some embodiments of the present disclosure.

The possible solutions 200 of the Signorini-Coulomb conditions (1-2) are summarized in FIG. 2; in the following, the set such of velocity-force pairs (u,r) are denoted by $C_\mu$.

The unconstrained conservation of momentum written at the end of a timestep may be written as:

$$M \dfrac{v - v^t}{\Delta_t} = -\dfrac{\partial}{\partial q} \mathcal{E}(q, v, t + \Delta_t) - \dfrac{\partial}{\partial v} \mathcal{D}(v, t + \Delta_t), \quad \text{(Equation M1)}$$

where M is the mass matrix and $\mathcal{E}$ and $\mathcal{D}$ respectively elastic and dissipation potentials. A Lagrangian advection scheme $q = q^t + \Delta_t v$, may be used to eliminate q from the above equation to produce:

$$\dfrac{\partial}{\partial v} \mathcal{A}(v) = 0, \quad \text{(Equation M2)}$$

with $\mathcal{A}$ the total energy, $$\mathcal{A} := \mathcal{E} + \mathcal{D} + \dfrac{1}{2}(v - v^t)^T M (v - v^t).$$

Incorporating contacts into the formulation through Lagrange multipliers yields the incremental problem:

$$\begin{cases} \dfrac{\partial}{\partial v} \mathcal{A}(v) = B^T r \\ u = Bv + k \\ (u, r) \in C_\mu \quad \forall\, 1 \leq c \leq n. \end{cases} \quad \text{(Problem 3)}$$

One approach to tackle Problem (3) is through the use of iterative quasi-Newton methods. At each iteration k, one constructs a symmetric operator $A^k$ approximating a square matrix of second-order partial derivatives of a scalar-valued function, or a scalar field, of energy that represents local curvatures, such as a hessian matrix of $\mathcal{A}$ at $v^k$, and proceeds to compute the next iterate $v^{k+1}$ as the solution of a Discrete Coulomb Friction Problem (DCFP), $$\begin{cases} A^k v^{k+1} = f^k + B^T r, \quad f^k := A^k v^k - \dfrac{\partial}{\partial v} \mathcal{A}(v^k) \\ u = B v^{k+1} + k \\ (u, r) \in C_\mu \quad \forall\, 1 \leq c \leq n. \end{cases} \quad \text{(Problem 4)}$$

Note that Problem (4) is itself a special case of Problem (3) where $\mathcal{A}$ is chosen to be quadratic. Some methods proposed to solve this DCFP have an efficiency largely determined by the structure of the matrix $A^k$. For general elastic bodies, $A^k$ can have a dense inverse, which renders methods requiring explicit assembly or many multiplications by the Schur complement $B A^{k-1} B^T$ intractable or at least computationally expensive. A more efficient approach is to use Alternating Directions Method of Multipliers (ADMM) to solve incremental Problem 3.

Alternating Directions Method of Multipliers (ADMM)

Friction may be treated using an associated friction law. For μ>0, the Signorini-Coulomb conditions define a non-associated flow rule, as when sliding occurs the displacement may not be orthogonal to the yield surface. In some cases, u.r<0, and thus energy dissipates. However, the associated version 300 of this law shown in FIG. 3 may be considered, which can be concisely expressed using conical complement as $$K_{\frac{1}{\mu}} \ni u \perp r \in K_\mu.$$

Figure 3:
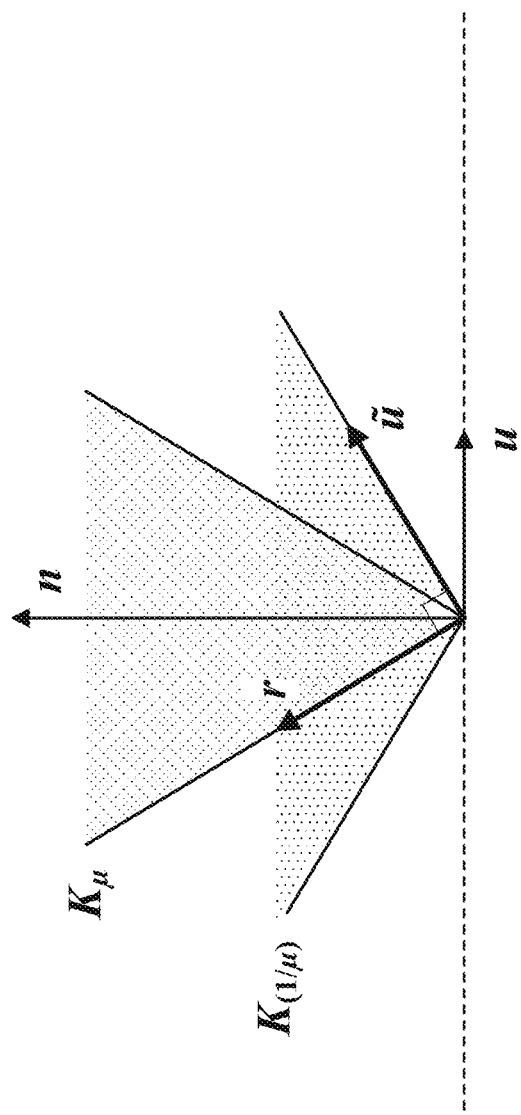
FIG. 3 illustrates frictional forces under an associated friction law, according to some embodiments of the present disclosure.

As shown in FIG. 3, feasible velocity vectors u and ũ for the non-associated (a.k.a. Coulomb) and associated flow rules. The associated velocity ũ may be orthogonal to the force r, which is not the case for Coulomb's law. This associated law can be interpreted as the optimality conditions of a convex minimization problem under conical constraints:

$$\tilde{u} = \operatorname{argmin}_{u \in K_{\frac{1}{\mu}}} f(u) \Leftarrow \left\{ K_{\frac{1}{\mu}} \ni \tilde{u} \perp \nabla f \in K_\mu \right\}. \quad \text{(Equation 1)}$$

In particular, replacing the Signorini-Coulomb conditions with this associated law in the incremental problem (3), one may recognize the optimality conditions of the convex minimization problem $$\min_{v \in \mathbb{R}^m, Bv + k \in K_{\frac{1}{\mu}}} \mathcal{A}(v).$$

Introducing an auxiliary variable $p \in \mathbb{R}^m$ constrained to be equal to v and applying the definition of the characteristic function $\mathcal{C}$ associated to the conical constraint produces:

$$\mathcal{C}: \mathbb{R}^m \to \mathbb{R}, \; p \mapsto \begin{cases} 0 & \text{if } Bp + k \in K_{\frac{1}{\mu}} \\ +\infty & \text{otherwise.} \end{cases}$$

This may be split into the optimization problem of:

$$\min_{v \in \mathbb{R}^m, p \in \mathbb{R}^m, p=v} \mathcal{A}(v) + C(p),$$

and write it under Augmented Lagrangian form:

$$\max_{\tilde{\lambda} \in \mathbb{R}^m} \min_{v \in \mathbb{R}^m, p \in \mathbb{R}^m} \mathcal{L}(v, p, \tilde{\lambda}),$$

$$\mathcal{L}(v, p, \tilde{\lambda}) := \mathcal{A}(v) + C(p) + \tilde{\lambda}^T \sqrt{W}(p - v) + \frac{1}{2}\|\sqrt{W}(p - v)\|^2.$$

Here W is a diagonal matrix assigning a weight $w_j > 0$ to each 3D DoF constraint $p_j = v_j$. Note that this does not mean using a soft constraint—the constraint weights are affecting the convergence of the algorithm, but not its final result, where strict equality should hold. How to choose these weights in practice is discussed later.

The ADMM method may be used to iteratively optimize over each variable of the Augmented Lagrangian, assuming the other two fixed; at iteration l:

$$v^{l+1} \leftarrow \arg\min_{v \in \mathbb{R}^m} \mathcal{L}(v, p^l, \tilde{\lambda}^l); \quad \text{(i)}$$

$$p^{l+1} \leftarrow \arg\min_{p \in \mathbb{R}^m} \mathcal{L}(v^{l+1}, p, \tilde{\lambda}^l); \quad \text{(ii)}$$

$$\tilde{\lambda}^{l+1} \leftarrow \tilde{\lambda}^l + \sqrt{W}(p^{l+1} - v^{l+1}). \quad \text{(iii)}$$

Introducing the change of variable $\lambda := \sqrt{W}^{-1}\tilde{\lambda}$ simplifies the notation, producing the ADMM iteration:

$$v^{l+1} \leftarrow \arg\min_{v \in \mathbb{R}^m} \mathcal{A}(v) + \frac{1}{2}\|\sqrt{W}[v - (p^l + \lambda^l)]\|^2; \quad \text{(i)}$$

$$p^{l+1} \leftarrow \arg\min_{p \in \mathbb{R}^m} C(p) + \frac{1}{2}\|\sqrt{W}[p - (v^{l+1} - \lambda^l)]\|^2; \quad \text{(ii)}$$

$$\lambda^{l+1} \leftarrow \lambda^l + p^{l+1} - v^{l+1}. \quad \text{(iii)}$$

Step (iii) is trivial, and Steps (i) and (ii) can be recognized as evaluating proximal operators for $\mathcal{A}$ and $\mathcal{C}$ under the W-norm. In particular, if $\mathcal{A}$ is quadratic, $$\text{e.g. } \mathcal{A}(v) := \frac{1}{2} v^T A v + f v,$$

then Step (i) reduces to a linear solve, $(A+W)v^{l+1} = f + W[p^l + \lambda^l]$. Note that the A+W matrix is constant, so it can be prefactored at the beginning of the algorithm. Step (ii) then amounts to projecting the point $v^{l+1} - \lambda^l$ onto the set $\{p \in \mathbb{R}^{3n}, Bp+k \in K_\mu\}$ orthogonally under the W-norm. The optimality conditions associated to this projection read:

$$\begin{cases} Wp = W[v^{l+1} - \lambda^l] + B^T r \\ u = Bp + k \\ K_{\frac{1}{\mu}} \ni u \perp r \in K_\mu. \end{cases} \quad \text{(Problem 5)}$$

Replacing the associated friction law, which was helpful in the derivations, with the Signorini-Coulomb contact law yields a more interesting problem. The projection optimality conditions (5) are transformed into a new DCFP, $$\begin{cases} Wp = W[v^{l+1} - \lambda^l] + B^T r \\ u = Bp + k \\ (u, r) \in C_\mu. \end{cases} \quad \text{(Problem 6)}$$

Any fixed-point of the ADMM algorithm where Step (ii) is achieved by solving the DCFP Problem 6 is indeed a solution to the initial incremental Problem 3. That is, even though an alternative friction law was used to derive the method, the method solves the right problem. Indeed, given Step (iii) any fixed point must satisfy p=v, where v is also a solution of Step (i), meaning $W\lambda = \nabla \mathcal{A}$. Plugging these two equalities into the first line of Problem (6) produces the incremental problem (3).

To recap what is gained by going through this process, instead of having to solve a series of DCFP (4), it is now sufficient to solve another series of DCFP (6). To illustrate the advantages of this, notice that the stiffness matrix of Problem (6), W, is diagonal by construction, which facilitate solving the problem much more efficiently. In essence, the original problem has been split into a series of elastic relaxation problems—Step (i)—and separate frictional contact projections (which might be pure frictional contact projections)—Step (ii).

Since the Delassus operator of Problem 6 is now possible to assemble, Step (ii) could be solved using any dual-based algorithm. However, the restriction on the degrees of freedom, Assumption 1, allows for a much more efficient local solver, explained below.

Isotropic Local Solver

In dual-based methods, p may be eliminated from Problem (6) by introducing the Delassus operator (a.k.a Schur complement) $S := B^T W^{-1} B$. The local problem that must be solved for each contact within the Gauss-Seidel loop is:

$$\begin{cases} u_c^k = S_{cc} r_c^k + u^* \\ (u_c^k, r_c^k) \in C_\mu, \end{cases} \quad \text{(Problem 7)}$$

where u* is the locally constant part of the relative velocity, $$u^* := \sum_{c \neq d} S_{cd} r_d^{k-1} + k_c,$$

and the 3×3 blocks $S_{cd}$ are computed as $S_{cd} = B_c \cdot W^{-1} B_d^T$. Now recall from above that the B matrix comprises scaled 3×3 identity blocks, $B_{cj} = b_{cj} \mathbb{1}_3$, and that W is diagonal, comprising 3×3 identity blocks, $W_{jj}=w_j\mathbb{I}_3$. This means that the diagonal blocks of the Delassus operator can be recognized as $S_{cc}=s_c\mathbb{I}_3$ with $$s_c = \sum_{j\in J_c} \frac{1}{w_j} b_{c,j}^2.$$

In other terms, the local problem is isotropic.

As the constraint weights $w_c$ are strictly positive, $s_c$ is strictly positive as well. The value $r_c^k$ may be expressed from $u_c^k$ as $r_c^k = \frac{1}{s_c}(u_c^k - u_c^*)$.

Since the Signorini-Coulomb conditions are insensitive to a strictly positive scaling on the force, the local problem boils down to $$(u_c^k, u_c^k - u_c^*) \in C_\mu. \qquad \text{(Problem 8)}.$$

One approach is to look for a solution $u^k$ in each possible case of the Coulomb law, which may be facilitated due to the isotropy of the local problem. The local problem has three cases: 1) If $u_N^* \geq 0$, then the contact is naturally separating, and $u^k=u^*$ is a zero-force solution of Eq (8); 2) If $u^* \in -K_\mu$, then $u^k=0$ is a sticking solution of Eq (8); and 3) otherwise, $\|u_T^*\|>0$, which allows directly constructing a sliding solution by zeroing-out the normal relative displacement and projecting the tangential force onto the cone boundary, where $u_N^k=0$ and $$u_T^k = u_T^* + \mu u_N^* \frac{1}{\|u_T^*\|} u_T^*.$$

Note that existence of a solution to the local problem is guaranteed from $S_{cc}$ being full-rank.

Explicitly assembling the Delassus operator S would be quite memory-consuming, and would make adding new contacts during the solve expensive, forbidding regularly checking for new continuous-time collisions.

Instead, the local solver may be combined with a matrix-free Gauss-Seidel algorithm. In this approach, the p vector is continuously updated using the newly updated force after solving each contact as $p \leftarrow p + W^{-1}B_c^T \cdot (r_c^k - r_c^{k-1})$. This allows computing $u_c^*$ directly from the displacement vector from which the previously applied contact contribution was subtracted, as in $u_c^* = u_c - B_c \cdot W^{-1} B_c T \cdot r_c^{k-1} = B_c p + k - S_{cc} r_c^{k-1}$. Below is a description of a programmatic method for generating a matrix-free Gauss-Seidel projection.

---

Method 1: Matrix-Free Gauss-Seidel Projection
for k >= 1 do //Gauss-Seidel iterations
  for c >= 1 do each contact
    //Compute current relative velocity
    $u_c^{k-1} \leftarrow \Sigma_{j\in I_c} b_{c,j} p_j + k_c$;
    //subtract previously applied force
    $u_c^* \leftarrow u_c^{k-1} - s_c r_c^{k-1}$;
    Compute $u_c^k$ from $u_c^*$ using the enumerative solver described above $$r_c^k \leftarrow r_c^{k-1} + \frac{1}{s_c}(u_c^k - u_c^{k-1});$$

//Report DoF velocity update
    for j∈ $J_c$ do

---

$$p_j \leftarrow p_j + \frac{b_{c,j}}{w_j}(r_c^k - r_c^{k-1});$$

end
  end
end

---

Figure 4B:
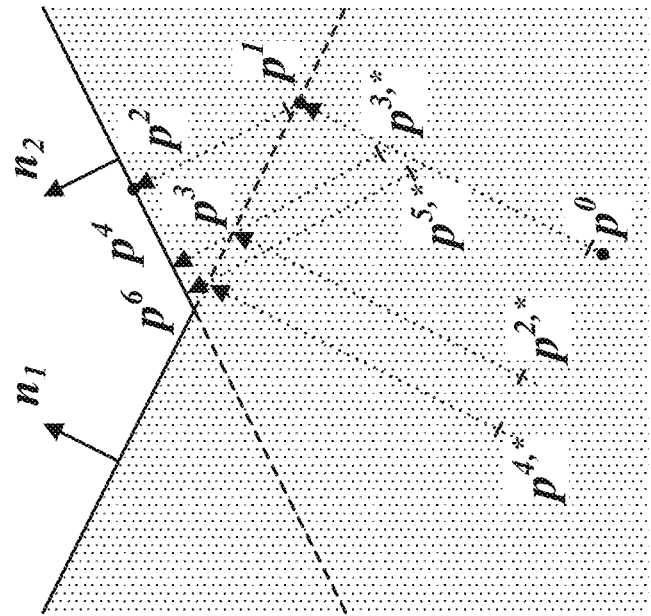
FIGS. 4A-4B illustrate a contact case in which two objects are contacting to create forces in an offset direction, according to some embodiments of the present disclosure.
Figure 4A:
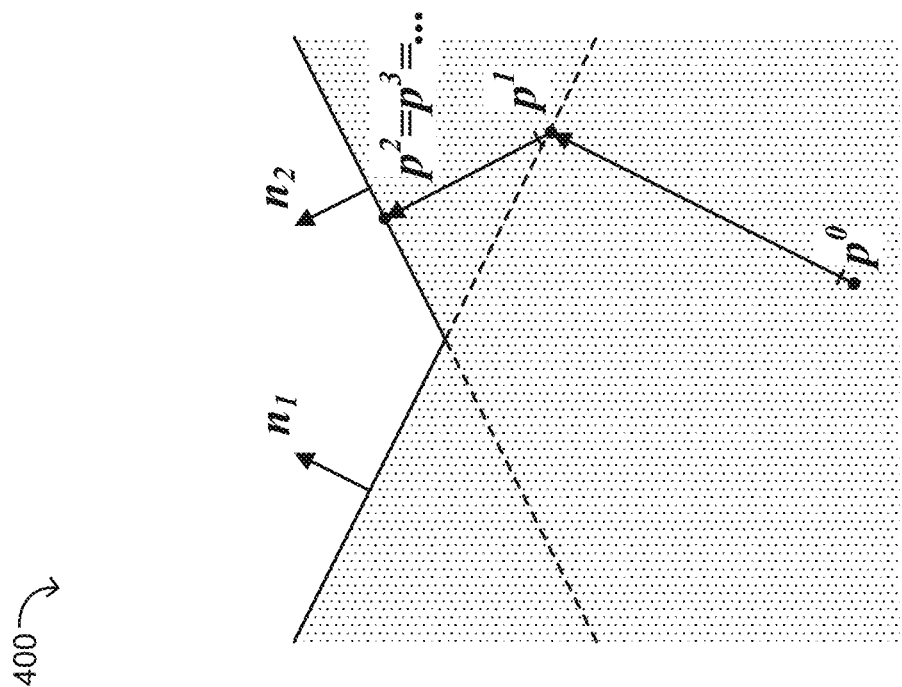

Method 1 bears some similarity to a PBD contact displacement update, but one notable difference is that it solves the Signorini-Coulomb conditions with $u_c^*$, while PBD would be using $u_c^{k-1}$ directly. Tracking and subtracting the previously applied force is helpful for properly enforcing the complementarity of the contact force and relative velocity variables, which PBD may violate when two contacts are "pushing" in slightly offset directions, as illustrated in FIGS. 4A and 4B, which illustrated a comparison of frictionless PBD contact resolution (FIG. 4A) with the present approach (FIG. 4B) for two contacts with normals $n_1$ and $n_2$ involving a single degree of freedom p. Starting from a point $p^0$, the PBD iterations stop as soon as the two contacts are not penetrating with both $p^k \cdot n1 > 0$ and $(p^k - p^0) \cdot n1 > 0$, thus violating the orthogonality of the Signorini condition and inducing strictly positive work. In contrast, Method 1, which first subtracts the force previously applied by each contact, correctly converges to the orthogonal projection of $p^0$ onto the feasible set. On the other hand, it is contemplated to use an existing PBD contact solver in method 1, and the two additional operations (tracking and subtracting $r_c$) are cheap both time- and memory-wise.

Up to a change of variable, method 1 performs a similar number of iterations to a PROX solver (e.g., iterative schemes based on proximal operators) when using a "blocked" r-Factor strategy. However, the isotropy of $S_{cc}$ in method 1 allows for at least substantial or exact enforcement of the local Signorini-Coulomb conditions after each contact solve, and updates involve only scalar multipliers rather than 3×3 matrices, making method 1 comparatively efficient.

Contact Solver Implementation

Method 2, below, illustrates a contact solver applied to a linearized dynamics equation Av=f, corresponding for instance to one step of a Projected Newton algorithm. The contact projection step described above is included in Method 2. Note that a few transformations are included in Method 2 for performance reasons, including precomputing the scaling coefficients of the DoF update and storing a scaled version of the contact force, $\bar{r}_c := s_c r_c$, to avoid superfluous divisions. As the DCFP that may be solved at subsequent ADMM iterations are usually quite similar, it is helpful to be able to warmstart the projection process. Method 2 includes this possibility. This allows truncating the number of Gauss-Seidel iterations that are run at each ADMM iteration heavily, usually below 10.

Method 2: Contact Solver for Linearized Dynamics
  Input: Dynamics linearized as Av=f
  Input: Tolerance ∈ (same units as v)
  Input: Maximum numbers of ADMM and Gauss-Seidel iterations
  Warm start velocity $v^0$ and forces $\lambda^0$
  Do proximity and continuous-time collision detection
  Compute diagonal approximation W of A
  Compute linear solver preconditioner $\mathcal{P}$ (A+W)
  Set $p \leftarrow v^0$
  for l≥1 do //do ADMM iterations
    //Update DoF velocities
    Solve $(A+W)v^l = f + W(p+\lambda)$ with preconditioner $\mathcal{P}$ Periodically update continuous-time collision detection
// Update feasible projection
p←v$^l$←λ;
Project p onto feasible set (See Method 3)
// Check exit criterion
δ←‖v$^l$−v$^{l-1}$‖$_\infty$+‖v$^l$|p‖$_\infty$
if δ<∈ or max iterations reached then break;
// Update dual forces
λ←λ+(p−v$^l$)
end Method 2 focuses on commonly used Projected-Newton-like integrators, and an ADMM based contact solver is included in an ADMM time integrator. Just like any other constraint, the weights matrix W must be added to the left-hand-side of the global step linear system, and the force W(p+λ) to the right-hand-side. The "local" step of the contact constraint comprises running the projection in Method 3, below. This strategy extends to self-collisions and frictional contacts.

---

Method 3: Projection onto feasible set
// Only when initializing contacts)
// Precompute scaling coefficients
for c ≥ 1 do //loop over new contacts $$s_c \leftarrow \sum_{j \in J_c} \frac{1}{w_j} b_{j,c}^2$$

for j∈ J$_c$ do $$\gamma_{c,j} \leftarrow \frac{b_{c,j}}{s_c w_j}$$

end
end
// Warm-start DoF velocities from previous forces
for c ≥ 1 do//loop over all contacts
  for j∈ J$_c$do
    p$_j$ ← p$_j$ + γ$_{c,j}$r̄$_c$
  end
end
//Run Gauss-Seidel loop
for 1 ≤ k ≤ maxGSIterations do
  for c ≥ 1 do //loop over all contacts
    // Compute current relative velocity
    u ← Σ$_{j∈J_c}$ b$_{c,j}$p$_j$ + k$_c$
    // Subtract previously applied force
    u* ← u − r̄$_c$
    // Make u* satisfy Coulomb law
    if u$_N$* < 0 then
      τ ← ‖u$_T$*‖
      α ← −μu$_N$*
      u$_N$* ← 0
      if τ ≤ α then u$_T$* ← 0 else $$u_T^* \leftarrow \left(1 - \frac{\alpha}{\tau}\right) u_T^*$$

end
    // Update force
    r̄$_c$ ← r̄$_c$ + (u* − u);
    //Report DoF velocity update
    for j∈ J$_c$ do
      p$_j$← p$_j$ + γ$_{c,j}$(u* − u)
    end
  end
end

---

Warmstarting Method 2 with the unconstrained velocity gives good results. Intuitively, the final solution is often close to the projection of the unconstrained velocity onto the feasible set, which is what is computed at the first iteration of Method 2 when starting from the unconstrained velocity. Note that in the case of a non-linear solver such as Projected Newton, this warmstarting strategy is helpful for the first iteration; for all subsequent iterations, the last iterate of the contact solver may be used, avoiding the cost of computing the unconstrained velocity.

As the dual force vector λ is defined on the DoF rather than contact points, it may be efficiently tracked across timesteps. One may start Method 2 with λ from the previous timestep or non-linear iteration.

Collision detection may use both proximity and continuous-time queries, accelerated by bounding volume hierarchies. Over the course of ADMM iterations, forces applied to DoF may introduce new collisions, so periodical checks for new continuous-time collisions may be performed. In some embodiments, every 5 iterations should be sufficient, though checking more frequently improves detection and less frequently improves performance. Checking more or less frequently than every 5 iterations is contemplated, such as every iteration, every other iteration, or every 10 to 20 iterations.

As the solver works directly on primal quantities (velocities or displacements), the error metric δ defined in Method 2 has a direct geometric meaning. Since it combines offsets between successive iterations and the feasible set, δ can directly be related to a displacement tolerance, which is, for example, a character example may be set to 10 μm. In some embodiments, this tolerance may not always be reached for the infinity-norm, so a maximum number of ADMM iterations may be enforced, usually in the 25-50 range, though more or fewer are contemplated.

Solving the linear system at each ADMM iteration may include a Cholesky preconditioner. At the beginning of the algorithm, an incomplete Cholesky preconditioner $\mathcal{P}$ (A+W) may be built by factorizing independently the blocks corresponding to individual dynamic objects. Then, the Conjugate Gradient method may be used to solve the successive linear systems. Note that if there are no soft constraints between dynamic objects, the preconditioner is exact and converges in a single iteration. If that is not the case, truncating the convergence of the linear solver may be accomplished by setting its tolerance to a fraction of the current ADMM residual δ.

In some embodiments, the rate of convergence of ADMM depends on the chosen constraint weights, which may be related to how the diagonal approximation W of A is constructed. Intuitively, W should reflect how hard it is to move a given DoF. In practice, for each 3D DoF j, extracting the corresponding 3×3 block from A, A$_{jj}$, and computing its minimum eigenvalue may yield satisfactory results. It would be possible to define directly w$_j$ from η$_j$, however this may overestimate the DoF weight, as the full stiffness matrix may have eigenvalues much smaller than any given diagonal block (consider, for instance, two light 3D particles stiffly constrained to keep the same position). To overcome this effect, the mass or inertia associated to the DoF, m$_j$ may be taken into account. This allows defining the weight w$_1$ using the expression w$_j$:=max min(ση$_j$,η$_j$))). This heuristic approach is robust. Possible values may be σ=0.001 and β=25, though other values such as a in the range of 0.0001–0.1 and β in the range of 1-100 are contemplated.

At each ADMM iteration two primal quantities are updated, v and p. They should coincide upon convergence of the algorithm, but in practice may differ ever slightly. One may thus choose either v or p as the final step velocities. Using v may yield a slightly lower elastic energy (as it results from a minimization of $\mathcal{A}$), while using p allows for the solution to be feasible, as it is the direct result of a projection onto the contact manifold. In a sense, the latter amounts to applying a final geometric correction step. For thin, two-sided objects, resolving collisions is generally more important than solving elasticity at very high accuracy, so, in such embodiments, using p as the final velocities would be preferred.

Most of the steps in Methods 1, 2, and 3 may be parallelized, though the matrix-free Gauss-Seidel method is not readily so. To ensure deterministic results independent of the thread scheduling, threads that run concurrently might each operate on distinct degrees of freedom. As it can be very challenging to split all contacts into fully independent sets, decomposing the contact projection into several sequential stages, and using a coloring algorithm to assign contacts to the different threads at each stage, can be useful to parallelize the methods fully. In practice, about eight stages is generally enough to find a suitable assignment for each contact, though more or few stages are contemplated.

A possible extension to some embodiments is cohesion. Cohesion can be modeled through the application of a constant, negative normal force at each contact point. This supplemental force can be incorporated into the above methods. FIG. 5A illustrates an animated sphere 502 colliding with a patch 504 of about four hundred sticky elastic rods, leading to the emergence of a clumped configuration. Modifying the initialization of the Gauss-Seidel solver from method 3 allows this. Rather than simply adding back the saved force $\bar{r}_c$ from the previous iteration, the cohesion force may be applied by replacing line $p_j \leftarrow p_j + \gamma_{c,j} \bar{r}_c$
in Method 3 with $p_j \leftarrow p_j + \gamma_{c,j}(\bar{r}_c - s_c \xi_c n_c)$. Note that this is equivalent to shifting the Signorini condition by $\xi$, $$-\xi \leq r_N \perp u_N \geq 0.$$

As noted above, the simulation depicted in FIG. 5 involves a patch of 401 30 cm-long hairs being clumped tightly under the effect of cohesion, and sticking to an animated ball collider. This example shows a simple cohesion model (linear fall-off of the attractive force between neighbouring primitives), but more involved ones could be used as well.

Another possible extension is compliance. Real-world animations regularly contain contradicting constraints which, in some cases, cannot be all simultaneously resolved, causing unnatural strains to the simulated objects. FIGS. 5B-5D show example demonstration of such deformations where a piece of clothing 508 that is being pinched between two kinematic spheres 506a, 506b (FIG. 5B) quickly becomes unstable without compliance (FIG. 5C) while finite compliance dampens the instability effect (FIG. 5D). In some situations, a slight violation of the contact constraints may be preferable to such deformations, and some contacts may be marked as compliant within the solver. For each contact c that should be made compliant, appending a virtual 3D slack DoF $p_{j_c}$ to the vector p, and inserting a new coefficient $b_{c,j_c}=1$ into the B matrix may make the contact c compliant. Then the compliance of the contact can be chosen by tuning the $w_{j_c}$ coefficient of the diagonal matrix W—determining the "inertia" of the virtual DoF. Setting $w_{j_c}=+\infty$ amounts to leaving the contact as non-compliant, but giving it a finite value will shift part of the contact-induced deformation to the slack DoF, the exact amount being determined by the ratio $$\gamma_{c,j_c} = \frac{1}{s_c w_{j_c}}.$$

Interestingly, adding a finite compliance to all contacts for which $k_N<0$ is sufficient—but not necessary—to ensure existence of a solution to the DCFP.

In many common applications, the majority of contacts converge well before the end of the ADMM algorithm. This means that keeping solving them at each iteration of the Gauss-Seidel projection can be wasteful. To focus the computational power onto the regions that are still being actively solved, contacts may be frozen in a contact-freezing heuristic. If the update $\|u-u^*\|$ is smaller than some threshold, solving the contact may be stopped for a fixed number of iterations. A workable threshold is $0.01\delta$, where $\delta$ is the current ADMM residual, and the contact may be unfrozen at the beginning of Method 3.

Examples

Figure 6:
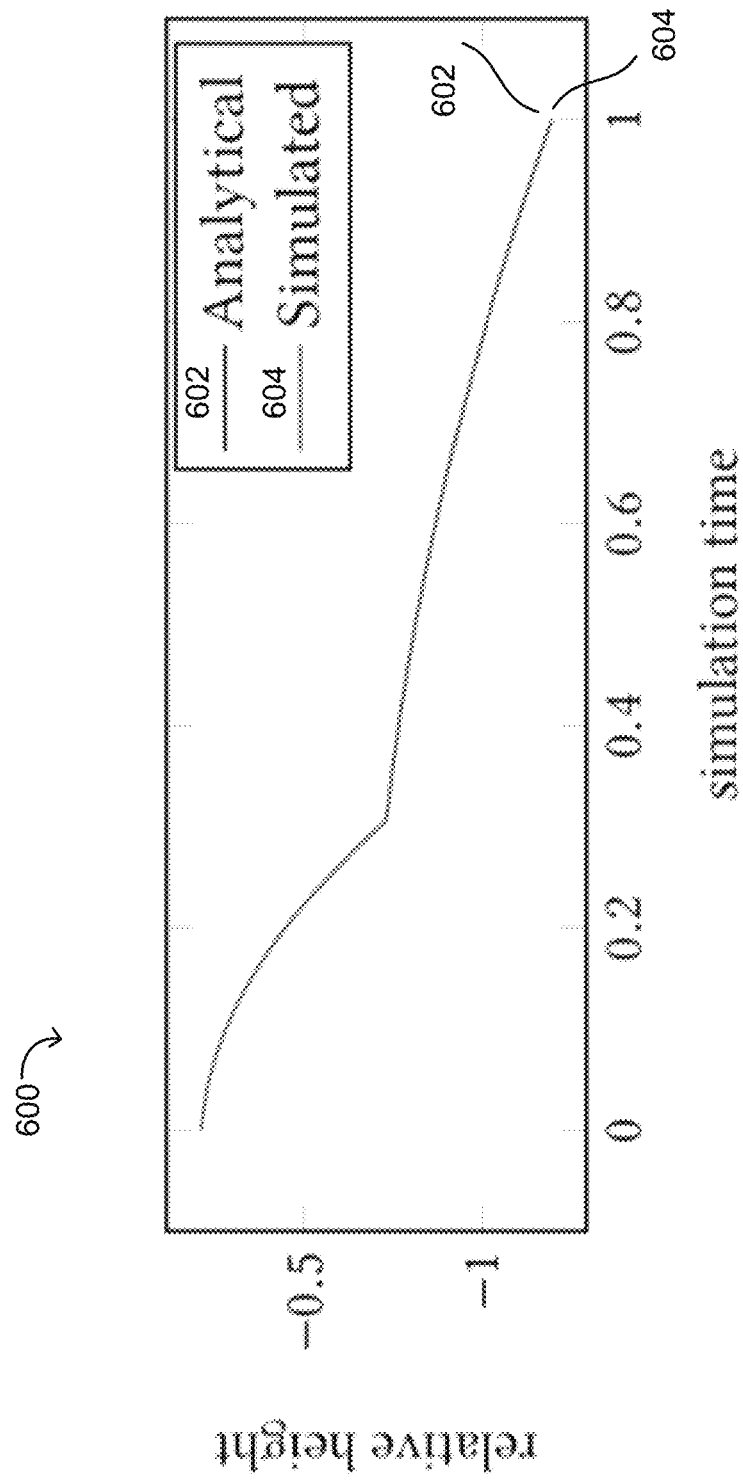
FIG. 6 illustrates a performance metric, according to some embodiments of the present disclosure.

To provide examples, Method 2 was applied to existing open source examples to gauge its performance. To be consistent with other solvers, collision detections were not updated during the ADMM iterations. Further, linear systems are solved using a diagonal-preconditioned Conjugate Gradient. Also, as their frictional problem interface provides the stiffness matrix A but not the mass matrix M, the diagonal weighting matrix W was defined as $w_j=0.17\eta_j$. The first test comprises comparing the motion of a square piece of cloth free-falling then sliding on an inclined plane against the analytical solution. Results are shown in the plot 600 of FIG. 6 comparing the analytical and simulated positions of the center of such a piece of cloth, and the plot 600 demonstrates very good agreement of the simulation curve 604 with the theoretical/analytical curve 602 (illustrated by the fact that the the analytical curve 602 and the simulation curve 604 overlap).

FIGS. 7A-7E show simulation results 700 for a variety of scenarios, including houses of cards varying friction coefficients (FIGS. 7C and 7D), a stretched conveyor belt (FIG. 7A), a piece of cloth dragged on a plane (FIG. 7B), and another cloth draping a box and a cone (FIG. 7E). In all those cases, the results are qualitatively similar to that of other simulations. Table 1 and FIGS. 7A-7E show that the solver is competitive from a computational performance point-of-view as well. Generally, nodal solvers perform well when the contact configuration is simple, but its performance can degrade in situations involving multiple layers, where it may duplicate many vertices—see, for instance, the house of cards example with low friction of FIG. 7D, or the later stage of the "Box & Cone" simulation (FIG. 7E). In contrast, the performance of Method 2 is much less affected.

TABLE 1

| Solver | Belt | Cards | | Dragging | Box & Cone |
| | | $\mu = 0.2$ | $\mu = 0.6$ | | |
|---|---|---|---|---|---|
| Method 2 | 45 | 2.4 | 92 | 0.4 | 275 |
| Nodal | 28 | 7.6 | 144 | 1.6 | 292 |
| NL-ICA | 189 | 8.7 | 495 | 8.2 | 490 |

Figure 8:
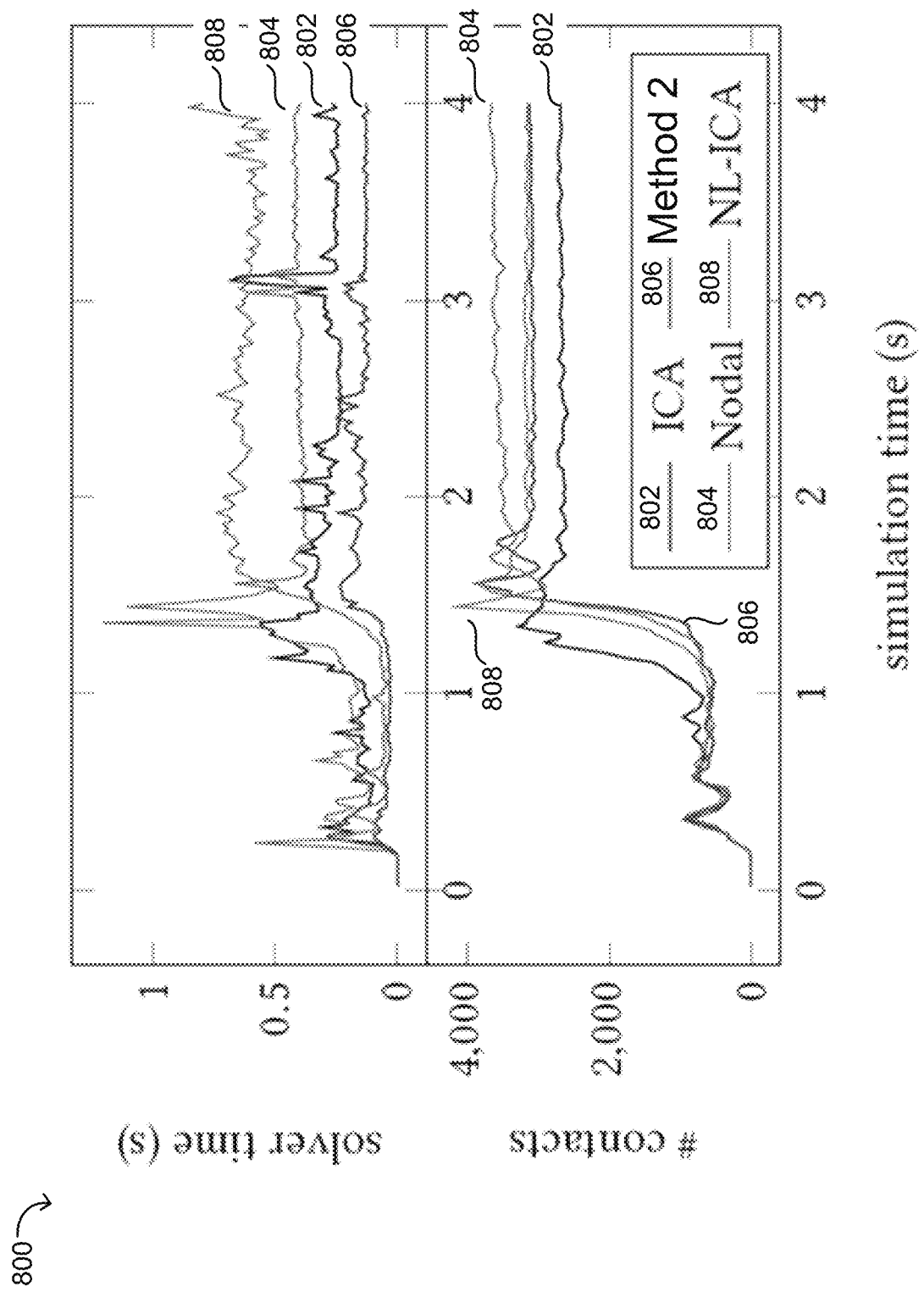
FIG. 8 illustrates performance metrics of one embodiment compared to other methods, according to some embodiments of the present disclosure.

FIG. 8 compares the performance of Method 2 806, in terms of contact solver time (top panel) and number of contacts (bottom panel), against a nested-relaxation (iterative constraint anticipation (ICA)) solver 802, a nodal solver 804, and a non-linear (NL) ICA solver 808, a modified version of ICA that solves the nonlinear friction law leveraging the local solver. While the simulations diverge quickly due to ICA using a faceted friction law, as is emphasized by the evolution of the number of contacts in time, it is clear that Method 2 remains competitive across the whole time range.

With the exception of the ADMM time integrator example, the following simulations are run using a Projected-Newton time integrator, with the sub-blocks in the incomplete Cholesky preconditioner being factorized leveraging MKL band-diagonal routine (for fibers) and Pardiso (for other objects).

Figure 9C:
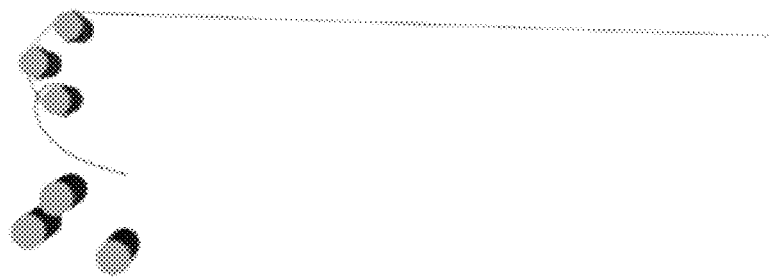
FIGS. 9A-9C illustrate the coupling between stretching modes and frictional contact on a one-dimensional fiber, according to some embodiments of the present disclosure.
Figure 9B:
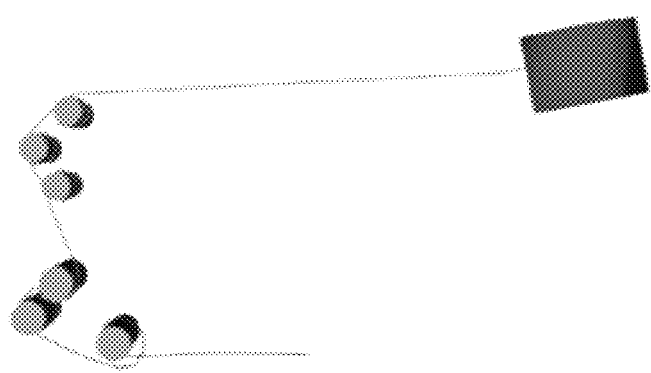
Figure 9A:
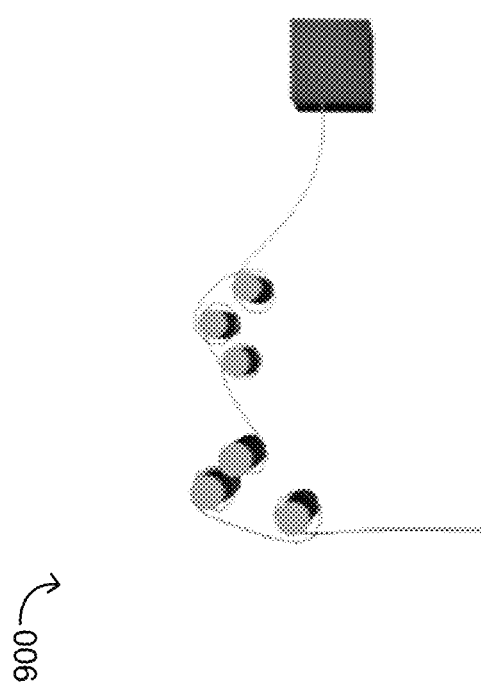

FIGS. 9A-9C illustrate the coupling between stretching modes and frictional contact on a one-dimensional fiber. A heavy elastic body is rigidly attached to the tip of a long Discrete Elastic Rod running through an ad-hoc belay device (FIG. 9A). Once the heavy mass is released under gravity and if the friction coefficient is sufficiently high, the device may self-lock, while in the low friction case, the strand unravels completely. Using a high friction coefficient ($\mu$=0.5), the device is self-locking (FIG. 9B), while a low friction coefficient ($\mu$=0.2) can lead to the rod unravelling count comparable to that of a human head of hair while staying well within the memory budget of a modern workstation. Table 2 shows performance results for medium and large scale simulations. The number of contacts and timings are averaged over the whole simulation, with maximum values given inside parentheses. Simulation times are given for a full 24 fps frame, and are defined as follow: $t_{frame}$ is the total elapsed time for the frame, including dynamics, collision detection, and contact resolution; $t_{solver}$ is the total time spent inside the contact solver; $\%_{linear}$ is the percentage of time spent solving linear systems; $\%_{proj}$ is the percentage of time spent in the contact projection method. "# steps" indicates the number of timesteps per 24 fps frame; the simulation used a fixed number of 2 Newton iterations per substep. "Peak GB" indicates the peak memory consumption of the process, including the host application. Simulations were allocated a subset of cores of two Intel™ Xeon™ E5-2680v3 processors. The "Long hair+Shirt 54 k" was stopped after the first 165 frames out of the usual 240 frame range—already past the most dynamic parts.

TABLE 2

| Scene | # $\Delta_t$ (ms) | # steps | # curves | # DoF | # contacts | $t_{frame}$ (s) | $t_{solver}$ (s) | $\%_{linear}$ | $\%_{proj}$ | # cores | Peak GB |
|---|---|---|---|---|---|---|---|---|---|---|---|
| Hairyball 16k | 10.4 | 4 | 15565 | 498k | 212k (337k) | 84 (109) | 39 (48) | 53 | 15 | 8 | 7.7 |
| Hairyball 32k | 10.4 | 4 | 31765 | 1.0M | 555k (902k) | 193 (271) | 86 (123) | 51 | 17 | 8 | 13.3 |
| Hairyball 64k | 10.4 | 4 | 63529 | 2.0M | 1.4M (2.3M) | 393 (542) | 177 (235) | 56 | 13 | 16 | 27.0 |
| Hairyball 127k | 10.4 | 4 | 127058 | 4.1M | 3.5M (5.7M) | 807 (1192) | 356 (416) | 54 | 17 | 16 | 51.3 |
| Hair band 5k | 6.9 | 6 | 5445 | 257k | 161k (219k) | 104 (124) | 56 (70) | 41 | 32 | 10 | 5.8 |
| Hair band 13k | 6.9 | 6 | 13308 | 638k | 569k (684k) | 242 (285) | 127 (141) | 38 | 34 | 20 | 12.9 |
| Hair band 27k | 6.9 | 6 | 26615 | 1.3M | 2.0M (2.4M) | 614 (718) | 331 (373) | 38 | 34 | 20 | 26.54 |
| Shirt only | 6.9 | 0 | 6 | 27k | 2026 (3228) | 62 (74) | 38 (45) | 87 | 0.4 | 8 | 2.7 |
| Long hair only | 6.9 | 6 | 5445 | 120k | 150k (260k) | 134 (283) | 37 (78) | 87 | 0.4 | 8 | 11.9 |
| Long hair +Shirt 5k | 6.9 | 6 | 5445 | 147k | 176k (340k) | 294 (442) | 116 (174) | 45 | 36 | 8 | 11.9 |
| Long hair +Shirt 27k | 6.9 | 6 | 27225 | 632k | 1.5M (4.43M) | 751 (1700) | 290 (651) | 29 | 50 | 24 | 60 |
| Long hair +Shirt 54k | 6.9 | 6 | 54450 | 1.2M | 3.27M (4.5M) | 1831 (3704) | 535 (811) | 28 | 45 | 16 | 36 |
| Furry Bunny | 6.9 | 6 | 29k | 217k | 78k (183k) | 350 (550) | 211 (364) | 60 | 23 | 14 | 8.1 |
| Palm tree | 20.8 | 2 | 0 | 128k | 43k (44k) | 36.5 (44.9) | 13 (18) | 96 | 0 | 24 | 6 | completely (FIG. 9C). This experiment illustrates the common scenario of a single contact layer, but far-range stretch propagation.

Figure 10:
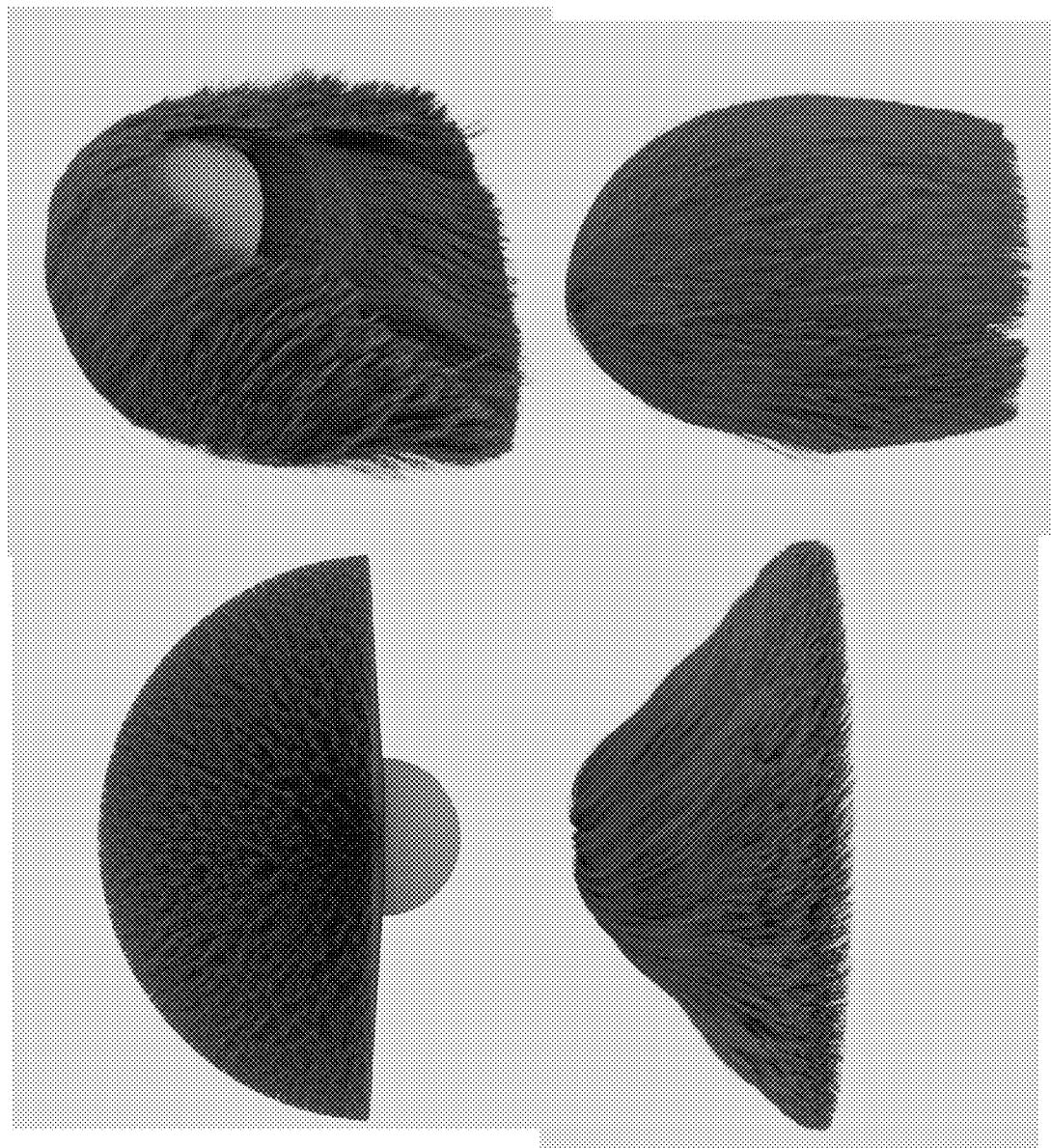
FIG. 10 illustrates a hairy ball test simulation in accordance with an embodiment, according to some embodiments of the present disclosure.

The scaling of the solver may be evaluated using hairy balls of increasing hair density. FIG. 10 illustrates example simulation results 1000 of hairy ball tests, where a hairy ball having 127,058 elastic rods goes through successive rotation. The simulation setup is of human-hair-like, slightly frizzy fibers grown on top of one hemisphere of a ball of diameter 18 cm. They are discretized using 30 elements per rod, and are given a radius of 0.037 mm. The balls are then subjected to a sequence of rotations around their three axis. Balls with 16 k, 32 k, 64 k and 127 k rods were simulated at a rate of 24 frames per second, using four timesteps per frame (with $\Delta_t$~10 ms) and a fixed number of two Newton iterations. The friction coefficient is set to 0.2. The highest-density ball contains 4.2M 3D DoF and induced a maximum of 5.6M contact points. Note that supplemental collisions detected during the ADMM iterations are not accounted for in the reported contact numbers. In the simulation, the proximity radius was set to the physical radius. The performance numbers reported in Table 2 show that the solver is more than competitive with other methods terms of CPU timings. Moreover, method 2 uses far less memory, which follows from not having to assemble the Delassus operator. This allowed simulating a hairy ball with density and curve To further evaluate the performance impact of the local solver, the matrix-free contact projection Method 3 may be modified to handle non-isotropic local problems by storing full 3×3 blocks and plugging-in the local solver. In addition, NL-ICA may be implemented by replacing the ADMM outer loop with the nested relaxation algorithm. Table 3 shows example costs for reaching about 0.01 mm tolerance and to perform a fixed number of 25 iterations on contact configurations obtained by initializing the solver with the geometry of 5 representative frames at various resolutions. In Table 3, "tol" indicates the tolerance (in mm) reached and contact projection time after 25 iterations, while "iters" indicates the number of iterations and contact projection time required to reach the prescribed 0.1 mm tolerance. "No sleep" disable contact sleeping heuristics and "Anisotropic" does not assume isotropy of local problems. Simulations were run on a 6-core IntelRXeonRE5-1650v4.

TABLE 3

|  | 16k tol | 16k iters | 32k tol | 32k iters | 64k tol | 64k iters |
|---|---|---|---|---|---|---|
| Method 2 | 0.4 | 31 | 0.02 | 31 | 0.01 | 29 |
|  | 0.5 s | 0.6 s | 1.3 s | 1.7 s | 3.1 s | 3.8 s |
| No Sleep | 0.4 | 30 | 0.03 | 37 | 0.02 | 28 |
|  | 1.2 s | 1.5 s | 3.1 s | 4.8 s | 7.7 s | 9.0 s |

TABLE 3-continued

|  | 16k tol | 16k iters | 32k tol | 32k iters | 64k tol | 64k iters |
|---|---|---|---|---|---|---|
| Anisotropic | 0.3 2.8 s | 30 3.3 s | 0.02 7.4 s | 31 9.3 s | 0.01 17.4 s | 29 20.4 s |
| NL-ICA | 0.9 4 s | 286 27 s | 0.15 11.7 s | 798 163 s | 0.17 27.7 s | 1578 715 s |

In some instances, hairy ball simulations with NL-ICA may not be completed due to the solver regularly diverging. The higher robustness of Method 2 illustrated in Table 3 as compared to the other methods may be due to NL-ICA's block-Gauss-Seidel having issues handling the staggered discrete elastic rods twist DoF, while the proximal penalization term provides stability to Method 2.

While the previous sections have shown that the performance of Method 2 is already competitive with more specialized solvers, the main motivation behind the approach was the ability to couple together dynamical objects of different topologies. Below are some examples which run such tests on medium-to-large scale scenes. The friction coefficients are set per-object, using the geometric mean to compute the final coefficient for contacts between two distinct objects.

Figure 11A:
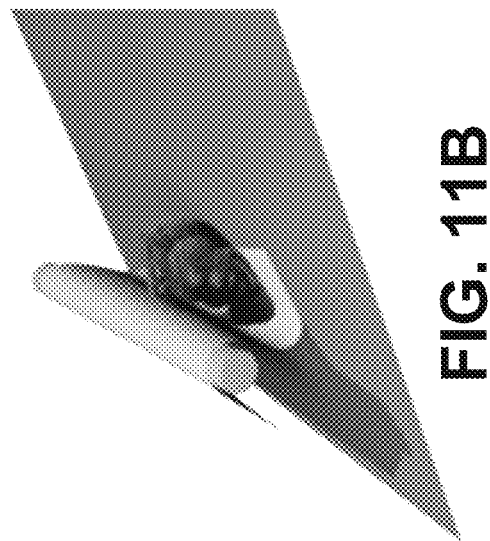
FIGS. 11A-11D illustrate a soft elastic bunny with a porcupine groom comprising about 29 k short elastic rods falling on an inclined plane and rolling into a cloth, according to some embodiments of the present disclosure.
Figure 11B:
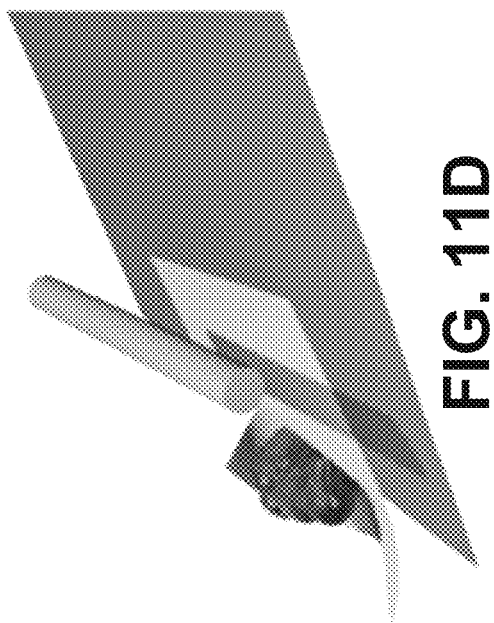
Figure 11C:
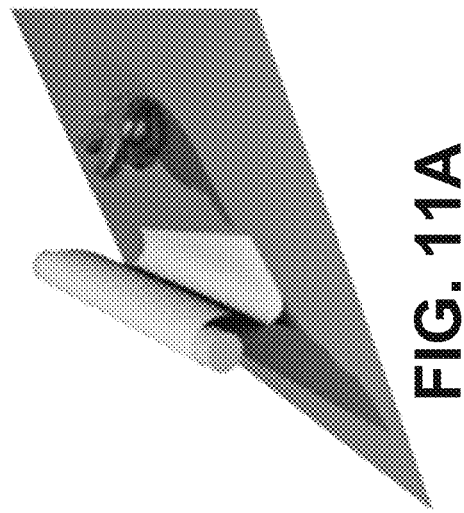
Figure 11D:
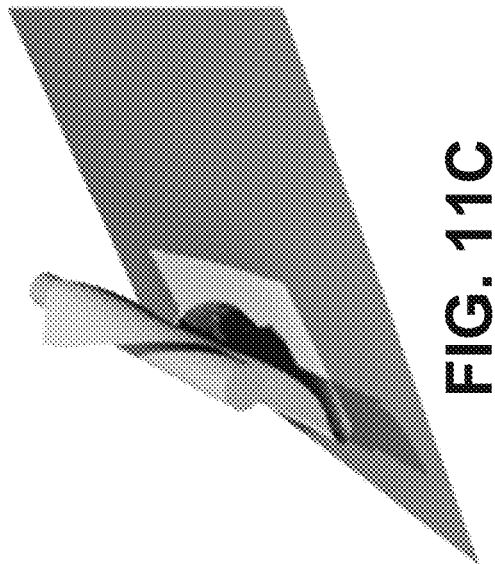

FIG. 11 illustrates a test 1100 comprising equipping a soft elastic bunny with a porcupine groom comprising 29,000 short elastic rods, letting it fall on an inclined plane (FIG. 11A) and roll through a piece of hanging cloth (FIGS. 11B-11D). The bunny is embedded in a non-conforming regular tet-mesh containing 48,000 vertices and subject to fixed co-rotated elasticity, while the cloth is using the Discrete Shell model and is meshed with 1.7 k vertices. The friction coefficients are set to 1.0 for the ground plane, 0.5 for the dynamical objects, and 0 for the cylinder. The high-velocity impact of the bunny on the ground, the spikiness of the strands colliding frontally with the thin layers of cloth (2 mm thick), and the stiff coupling between the rods and the elastic bunny all contribute to make this scene highly challenging for frictional contact solvers.

Figure 12:
FIG. 12 illustrates a stretched elastic hair band holding a medium-length curly groom in place, according to some embodiments of the present disclosure.

FIG. 12 illustrates a simulation result 1200 of a typical scenario which would be really hard to make look right leveraging solely one-way coupled setups, but that can be simulated seamlessly with method 2: the tightly coupled dynamics of a stretched elastic hair band holding a medium-length curly groom in place. Note that the band is maintained in place solely by contact and friction with the underlying hairs and head; no additional constraints are used. The friction coefficients are set to 0.2 for the hair, and 0.5 for the elastic band and character body. Typical human hair physical parameters are used, while the band is given a thickness of 5 mm, a volumetric mass of 400 kg·m$^{-3}$, and stretching and bending Young modulus of 1 MPa and 1 kPa, respectively.

The solver manages to robustly handle this complex contact configuration, even as the character goes through a running motion. Timings for varying densities of hair curves are reported in Table 2.

FIG. 13 illustrates an example simulation result 1300 of a character with a shirt and a long hairstyle going through a running motion. The friction coefficients are again set to 0.2 for the hair, and 0.5 for the shirt and character body. The shirt is now given a thickness of 2 mm, and a volumetric mass of 1000 kg·m$^{-3}$. To reduce drag due to the fast motion, a narrow-band of air is also simulated around the hair. This running sequence is inducing a swinging motion of the hair, which repeatedly impacts the simulated shirt. Again, simulating the scene with staggered one-way coupled solves would not be straightforward; the full mass of hair is heavier than the shirt, but individual strands are much lighter. The groom comprises 54,450 discrete elastic rods, totaling 1.2M degrees of freedom, while the shirt mesh contains about 27,000 vertices. This scene induces as much as 4.5M contacts, which are solved implicitly and with exact Coulomb friction thanks to Method 2.

The shirt/hair scene was simulated with varying hair curve densities. In order to estimate the cost of coupling, it was simulated with either just the hair or just the shirt. Overall, from the statistics reported on Table 2, this scene is harder on the solver. For a similar problem size, the solve times are significantly higher than for the hairy balls, and proportionally a larger amount of time is spent inside the contact projection step. Indeed, the long, straight hairstyle is prone to create packed strand assemblies, and as a result creates a very high number of contacts. The simulation thus suffers from a relative scarcity of degrees of freedom, which can be confirmed using criterion based on the ratio $$\frac{\mu n}{m}$$

ratio. Intuitively, this means a denser Delassus operator. Running the simulation with both hair and shirt is slightly more expensive than running the two elements separately. This can be explained by the increased number of contacts induced by collisions between hair and shirt.

Method 2 can also be applied to frame-based models by discretizing, for example, a palm tree using a one-dimensional wireframe for the trunk and two-dimensional surfaces for the leaves, both using Linear Blend Skinning shape functions and co-rotated elasticity. The motion of this tree under a fresh breeze that induces many leaf-leaf and leaf-branch collisions is depicted in the simulation result 1400 in FIG. 14.

Figure 15:
FIGS. 15A-15C illustrate a wavy hairstyle under gravity, according to some embodiments of the present disclosure.

The ADMM time integrator can be combined with the contact solver to provide an efficient way of relaxing a wavy hairstyle under gravity, as shown in the simulation result 1500 of FIGS. 15A-15C. This naive grooming attempt comprises starting from a porcupine initial geometry (FIG. 15A), first applying a backwards acceleration (FIG. 15B), then switching back to normal gravity (FIG. 15C). The 53507 strands with 100 vertices each are simulated as Discrete Elastic Rods with quasistatic twist relaxation, leading to cheap, decoupled tridiagonal linear systems having to be solved at each global step of the algorithm. Due to the slow relative velocities, collision detection is performed using proximity queries only. This approach is very memory-efficient, with simulation only requiring 15 GB despite containing 5.4M DoF and over 11.9M contacts in the later stages. The total runtime on a modern 6-core processor was 9.6 hours for 200 frames, thus using 174 seconds per frame, on average.

By design and through Assumption 1, this approach focused on specific kinds of DoF. The results show that the methods are still capable of simulating a large class of objects. One challenging application is rigid bodies. For instance, the closest approximation in this framework would be to use a 12-DoF elaston equipped with a stiff elastic material. Extending these methods to handle arbitrary DoF would be relatively straightforward. The use of ADMM to decompose the incremental problem into an elastic relaxation part and a simpler contact projection is still valid, and a more general-purpose approach could be used to solve the DCFP with a diagonal stiffness matrix. This may imply a significantly higher per-iteration cost and implementation complexity.

The solver is designed to be very efficient at solving the isotropic Signorini-Coulomb conditions, and could be adapted to solve similar contact laws, such as anisotropic Coulomb friction. Broader varieties of contact laws are also contemplated.

Figure 16:
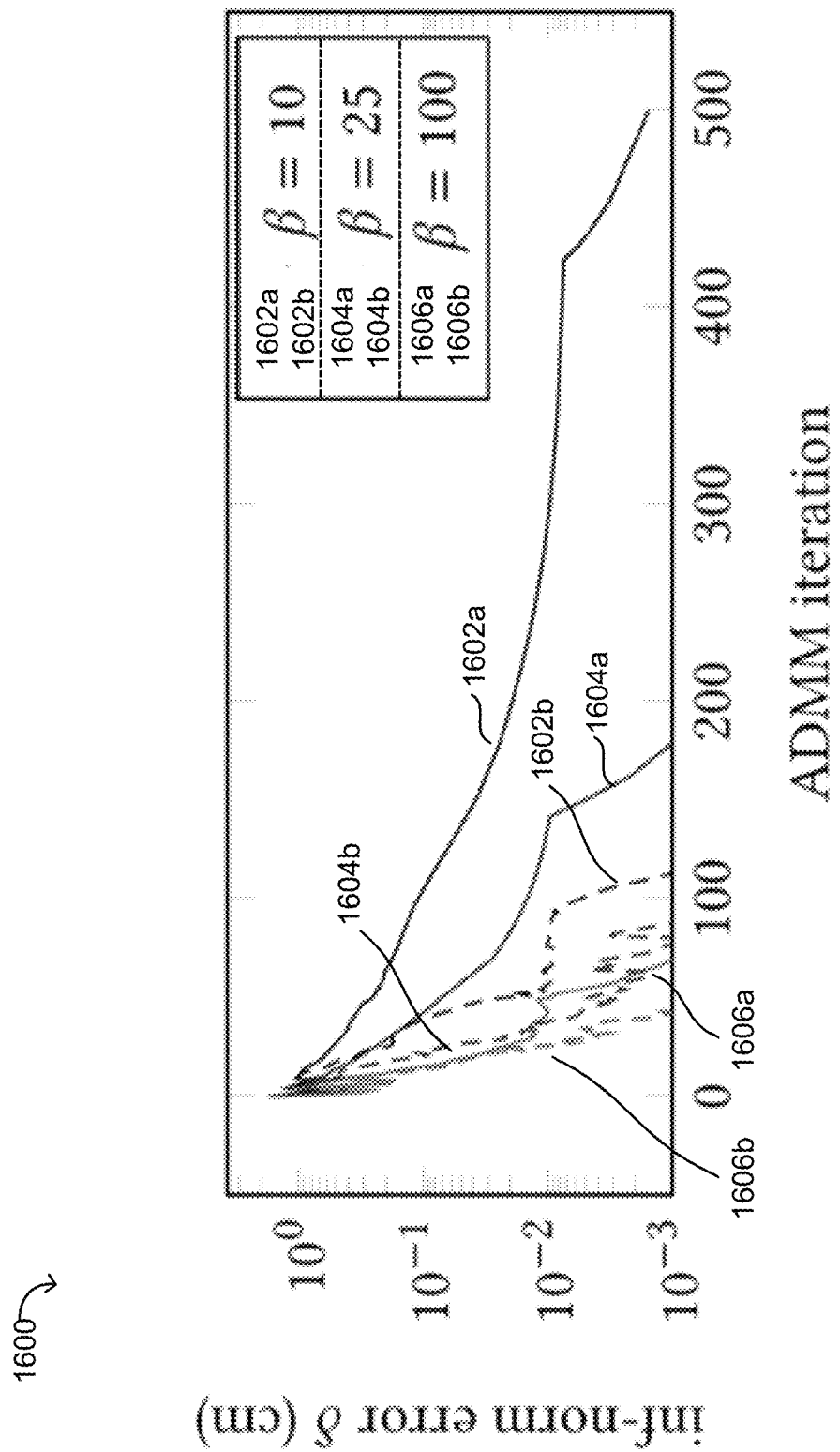
FIG. 16 illustrates performance of an implementation of an embodiment under different choices of parameters, according to some embodiments of the present disclosure.

In some embodiments, the choice of weights for the constraint in the Augmented Lagrangian formulation has a noticeable impact on the convergence behaviour and resulting performance of the method. Some of the choices based on the DoF inertia and the minimum eigenvalue of associated diagonal block may not seem intuitive and can seem rather arbitrary at first. FIG. 16 shows that the choice of the relative inertia weight, does affect the convergence (e.g., demonstrated by a comparison of curve 1602a ($\beta$=10), curve 1604a ($\beta$=25), and curve 1606a ($\beta$=100)), though using the accelerated variant discussed below can reduce this effect (e.g., demonstrated by a comparison of curve 1602b ($\beta$=10), curve 1604b ($\beta$=25), and curve 1606b ($\beta$=100)). However, in practice using approximately =25 is rather robust, and generally may not require tuning for any of the examples presented above, despite the variety in size, shape and topology of the dynamical objects.

Figure 17B:
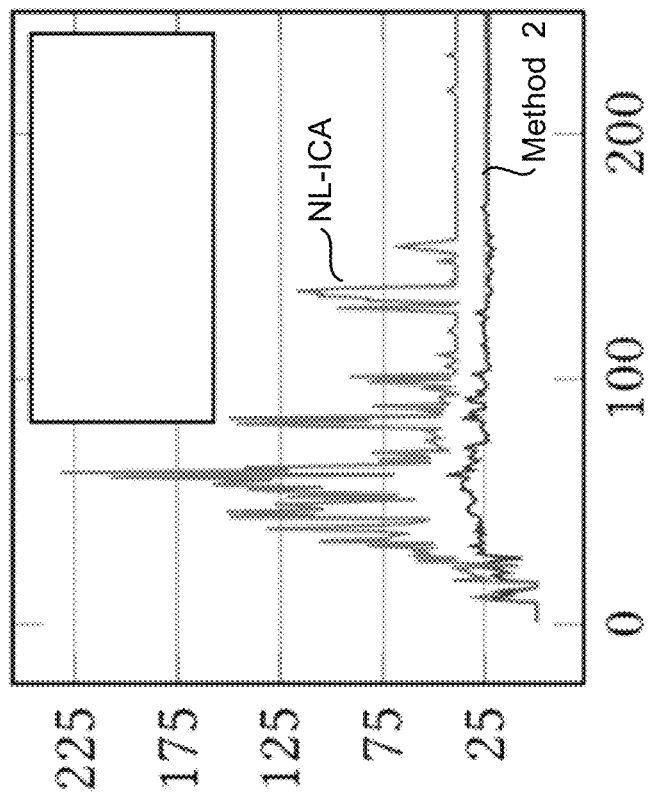
FIG. 17A illustrates processing with features having a high DoF-to-contacts ratio and FIG. 17B illustrates a comparison of performance relative to that of NL-ICA.
Figure 17A:
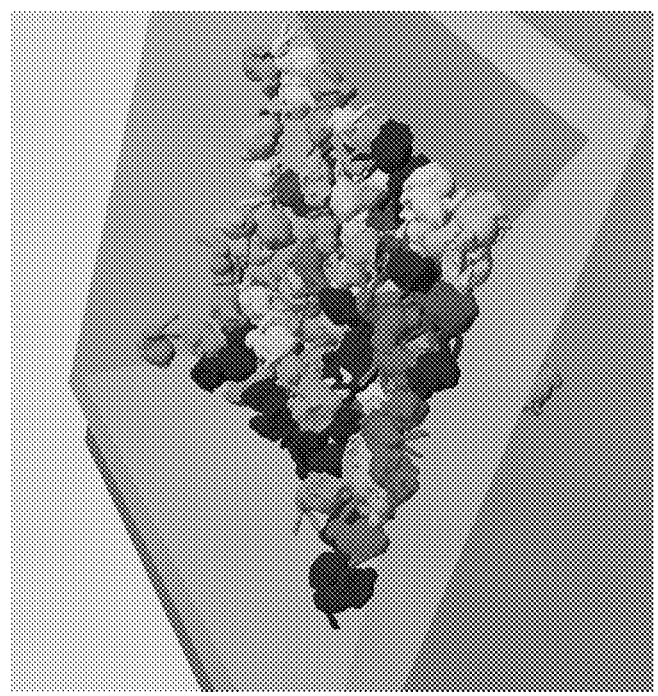

FIG. 17 comprises FIGS. 17A and 17B. In some embodiments, Method 2 may also be applied to volumetric bodies (e.g., in comparison to thin objects such as hair, etc.). For example, the method may be applied to a "120 bunnies" example, illustrated in FIG. 17A, which features a high DoF-to-contacts ratio. FIG. 17B compares the performance of Method 2 to that of NL-ICA using a timestep of 1 ms, and shows that Method 2 systematically uses less iterations (per frame average) to reach the prescribed tolerance of 0.01 mm. In FIGS. 17A-17B, the outer surface of each bunny was discretized using 2498 faces and embedded in a non-conforming tet-mesh containing 2131 elements. Method 2 simulation ran at an average of 5.5 per timestep on an Intel® Xeon® E5-1650v4 3.6 GHz (16.9 seconds per timestep single-threaded) while always reaching the prescribed tolerance.

Figure 18:
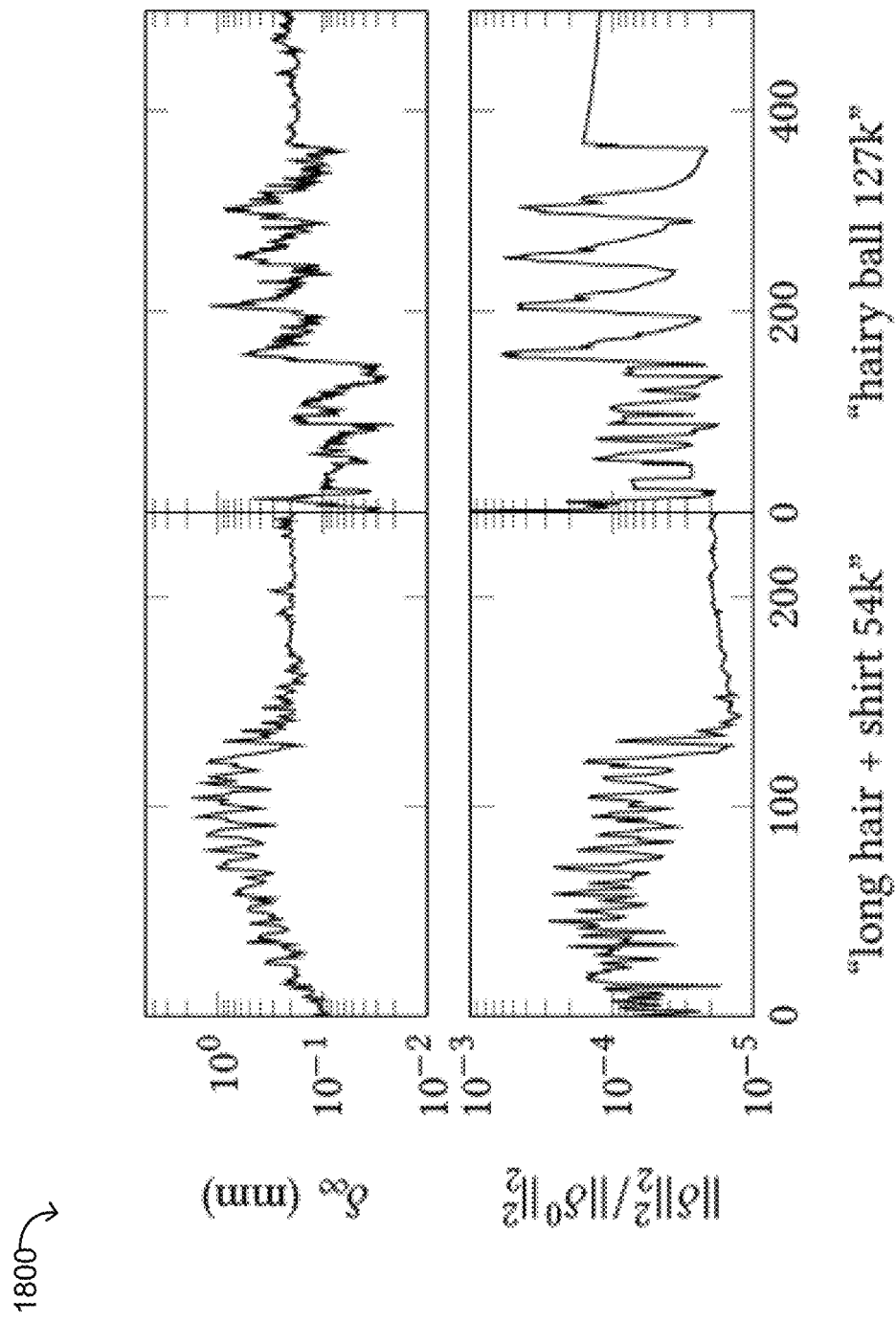
FIG. 18 illustrates number of iterations of simulations as indicator of performance of an implementation of an embodiment, according to some embodiments of the present disclosure.

One of initial goal was to limit the number of non-physical parameters that would need to be tuned by an artist to produce a simulation as much as possible. Tables 4 and 5 list summaries of values of physical and non-physical parameters used in the simulations described herein. With respect to the former, the parameters are D: thickness/diameter (in mm); $\rho$: volumetric mass in g·cm$^{-3}$; $E_b$ and $E_s$: bending and stretching moduli (in MPa); v: Poisson ratio; $\mu$: friction coefficient; and $\xi$: elastic damping (in ms). In the simulations, the Discrete Elastic Rods and Discrete Shells models were used for 1D and 2D objects, respectively, while either co-rotated or fixed co-rotated elasticity models were used for volumetric bodies. With respect to Table 5, the parameters are $N_{PN}$: fixed number of Projected Newton iterations; NAD: maximum number of ADMM iterations; $N_{GS}$: fixed number of Gauss-Seidel iterations; infinity-norm ADMM tolerance in mm; $\tau_{LS}$: linear solver tolerance as ratio of $\delta$ when the preconditioner is inexact; and $\beta$, $\sigma$: parameters for building the diagonal approximation. Aside from the constraint weight discussed above, Method 2 still uses a maximum number of iterations for the Gauss-Seidel and ADMM loops, and optionally a number of iterations and tolerance for the iterative linear solver. As shown in FIG. 18, for the largest simulations of Method 2, the prescribed infinity-norm tolerance is infrequently reached, and the solver terminates due to reaching the maximum number of ADMM iterations. In practice, changing the number of ADMM iterations is sufficient to tune the method, for example doubling it from 25 to 50 when requiring increased accuracy of the contact solver for the "Furry Bunny" example. Deriving a more perceptual exit criterion, taking into account possibly infeasible contact configurations would help reduce the effect of this parameter.

TABLE 4

| Object | D | $\rho$ | $E_b$ | $E_s$ | v | $\mu$ | $\xi$ |
|---|---|---|---|---|---|---|---|
| Hairy ball | 0.7 | 1.3 | 4000 | 100 | 0.48 | 0.2 | 1 |
| Long Hair | 0.8 | 1.3 | 4000 | 100 | 0.48 | 0.2 | 1 |
| Shirt | 2 | 1 | 0.001 | 1 | 0.4 | 0.5 | 5 |
| Curly Hair | 0.8 | 1.3 | 4000 | 100 | 0.48 | 0.2 | 1 |
| Hair Band | 5 | 0.4 | 0.001 | 1 | 0.4 | 0.5 | 5 |
| Bunny, fur | 0.5 | 1.3 | 4000 | 100 | 0.48 | 0.2 | 1 |
| Bunny, cloth | 2 | 1 | 0.001 | 1 | 0.4 | 0.5 | 5 |
| Bunny, body | — | 1 | 0.025 | 0.025 | 0.2 | 1 | 0 |
| Palm Tree | — | 0.2 | 0.25 | 0.25 | 0.3 | 0.5 | 10 |
| 120 Bunnies | — | 1 | 5 | 5 | 0.4 | 0.5 | 0 |

TABLE 5

| Newton | $N_{PN}$ | $N_{ADMM}$ | $N_{GD}$ | $\epsilon_\infty$ | $\tau_{LS}$ | $\beta$ | $\sigma$ |
|---|---|---|---|---|---|---|---|
| Hairy ball | 2 | 25 | 5 | 0.01 | — | 25 | 0.001 |
| Hair & Shirt | 2 | 25 | 10 | 0.01 | — | 25 | 0.001 |
| Hair & Band | 2 | 25 | 10 | 0.01 | — | 25 | 0.001 |
| Furry Bunny | 2 | 50 | 25 | 0.01 | $10^{-4}$ | 25 | 0.001 |
| Palm Tree | 2 | 25 | 5 | 0.01 | — | 25 | 0.001 |
| 120 Bunnies | 1 | 250 | 10 | 0.01 | — | 25 | 0.001 |

With ADMM being a first-order method, the method generally can run for a few dozens iterations before yielding satisfying results. Despite being competitive with existing methods, the runtime on full-resolution scenes may be very high, and in some cases, verge on the side of untractability. However, the ability of the method to two-way couple various dynamical elements should help reduce the number of iterations required to simulate a complex animation sequence. The algorithm may be executed on a massively parallel architecture in order to reduce run-time. The main difficulty of such parallelization is the Gauss-Seidel contact projection.

Leveraging a loose assumption on the degrees of freedom of dynamical objects allows solving nonlinear dynamics of elastic bodies with frictional contact and exact Coulomb friction. While convenient to implement, this approach scales to millions of contacts and degrees of freedom and allows seamless coupling of fiber assemblies, shells, and volumetric bodies, unlocking the simulation of virtual characters and their environment with an unprecedented amount of details.

A few notes on Equation 1 and convex optimality conditions are disclosed. The normal cone to a convex set $C \subset \mathbb{R}^n$ at x is defined as the closed convex cone $\mathcal{N}_C(x):=\{z\in \mathbb{R}^n, (z-x)\cdot y<=0 \forall y \in C\}$. The following equivalence provides a convenient way of expressing the optimality conditions of a convex optimization problem: Let f: $\mathbb{R}^n \mapsto \mathbb{R}$ be a differentiable convex function, then $$\tilde{x} = \min_{x\in C} f(x) \Leftarrow \nabla f(\tilde{x}) \in -\mathcal{N}_C(\tilde{x}).$$

Note the following expressions of remarkable normal cones: Property 1 (Normal cone to the second-order cone $K_\mu$). There hold following equivalences:

$$y \in -\mathcal{N}_{K_\mu}(x) \Leftarrow x \ni K_\mu \perp y \in K_{\frac{1}{\mu}} \Leftarrow x \in -\mathcal{N}_{K_{\frac{1}{\mu}}}(y);$$

Property 2 (Normal cone to the precomposition by an affine map) Let $\mathcal{B}: \mathbb{R}^m \mapsto \mathbb{R}^n$, $v \to Bv+k$ be an affine map, and let $V:=\{v, \mathcal{B}(v) \in C\}$. Then there always holds the inclusion:

$$B^T \mathcal{N}_C(\mathcal{B}(v)) \in \mathcal{N}_V(v),$$

and the equality is achieved under the sufficient condition that the interior of V is non-empty.

Combining the above properties together gives the following result: Let f: $\mathbb{R}^m \mapsto \mathbb{R}$ be a differentiable convex function, $\mathcal{B}: \mathbb{R}_m \mapsto \mathcal{B}^n$, $v \to Bv+k$ an affine map, and C:=

$$\left\{ v \in \mathbb{R}^m, \mathcal{B}(v) \in K_{\frac{1}{\mu}} \right\}.$$

Then the existence of $r \in \mathbb{R}^m$ such that:

$$\begin{cases} \nabla f(v) = B^T r \\ K_{\frac{1}{\mu}} \ni \mathcal{B}(v) \perp r \in K_\mu \end{cases}$$

implies that v realizes the minimum of f over C, and the reverse implication is granted if the interior of C is non-empty.

A few notes on the derivation of the three cases from Problem 8 may also be informative. Studying each case of the proposed local solver shows that all satisfy the Signorini-Coulomb conditions 1 and 2. In case 1, the separating case, set u=u* and r=u−u*=0. Since $u_N \geq 0$ and $r_N=0$, the Signorini condition is satisfied, and $r_T=0$ always satisfy the Coulomb condition. In case 2, the sticking case, set u=0 and thus r=−u*∈$K_\mu$. Both conditions are again satisfied. In case 3, the last case, observe that $u^*_N<0$ and $\|u^*_T\| \neq 0$. Setting $u_N=0$, and thus $r_N=u_N-u^*_N \geq 0$, shows that the Signorini condition is satisfied. Moreover $$r_T = \mu \frac{u^*_N}{\|u^*_T\|} u^*_T = -\mu r_N \frac{u^*_T}{\|u^*_T\|},$$

which is also satisfies the Coulomb condition.

As a note on ADMM acceleration, it is possible to accelerate variants of the ADMM method using Nesterov acceleration, though the practical performance improvement may be limited.

---

Method: Accelerated ADMM iterations
$\theta^0 \leftarrow 1$;
$\hat{p} \leftarrow p^0$;
$\hat{\lambda} \leftarrow \lambda^0$;
for l ≥ 1 do // Do ADMM iterations
  // Update DoF velocities
  Solve $(A + W)v^l = f + W(\hat{p} + \hat{\lambda})$;
  // . . .
  // Update feasible projection
  $p^l \leftarrow v^l - \hat{\lambda}$
  Project $p^l$ onto feasible set using Method 3
  // . . .
  // Update dual forces
  $\lambda^l \leftarrow \hat{\lambda} + (p - v^l)$
  if residual is increasing then
    // Reset acceleration
    $\theta^l = 1$;
    $\hat{p} \leftarrow p^l$;
    $\hat{\lambda} \leftarrow \lambda^l$;
  else
    //Add momentum
    $\theta^l \leftarrow \frac{1}{2}\left(1 + \sqrt{1 + 4(\theta^{l-1})^2}\right)$
    $\hat{p} \leftarrow p^l + \frac{\theta^{l-1} - 1}{\theta^l}(p^l - p^{l-1})$
    $\hat{\lambda} \leftarrow \lambda^l + \frac{\theta^{l-1} - 1}{\theta^l}(\lambda^l - \lambda^{l-1})$
  end
end

---

Exemplary Embodiments

Figure 19:
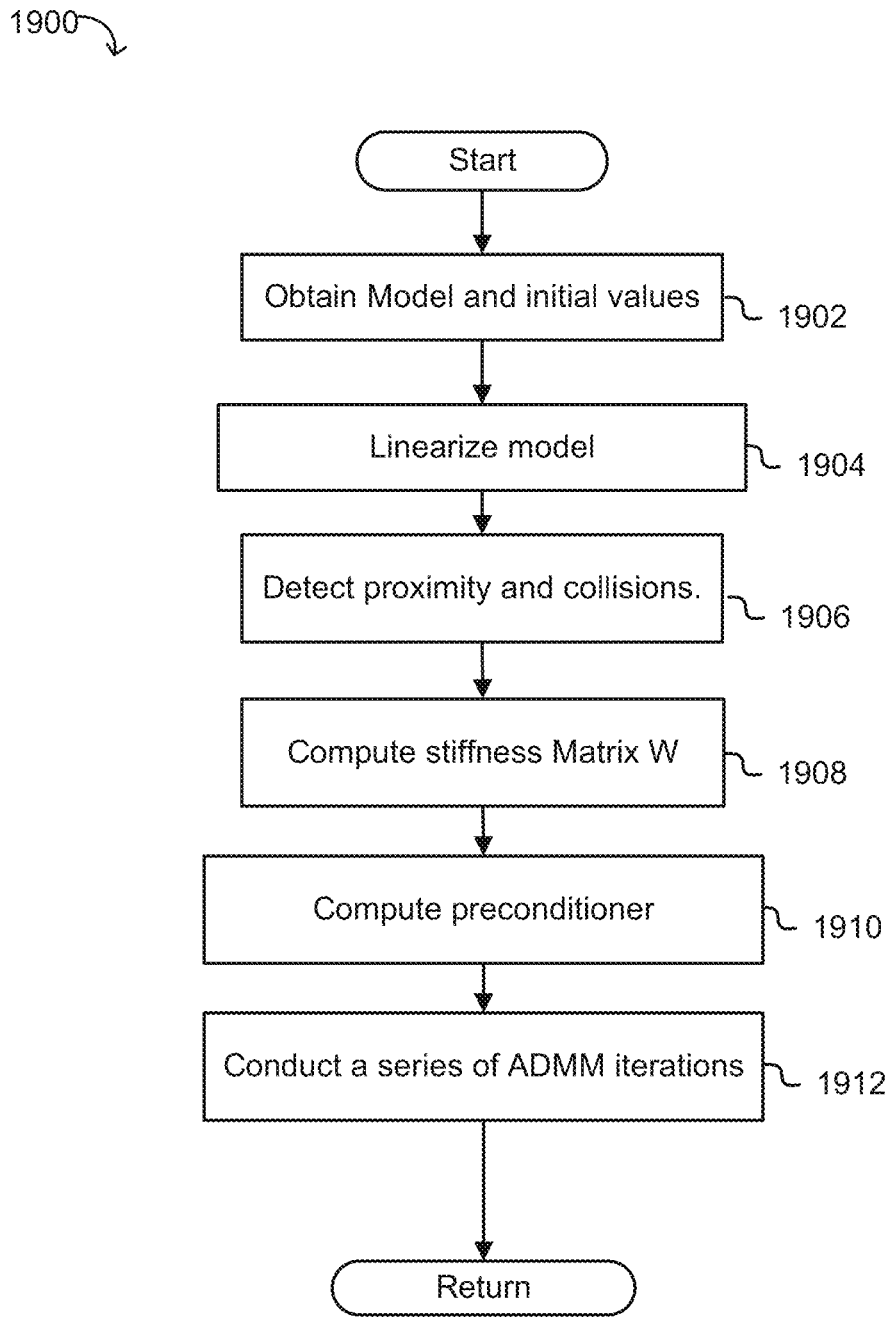
FIG. 19 illustrates a method for generating realistic computer-animated interactions between multiple physical bodies having different properties, according to some embodiments of the present disclosure.
Figure 23:
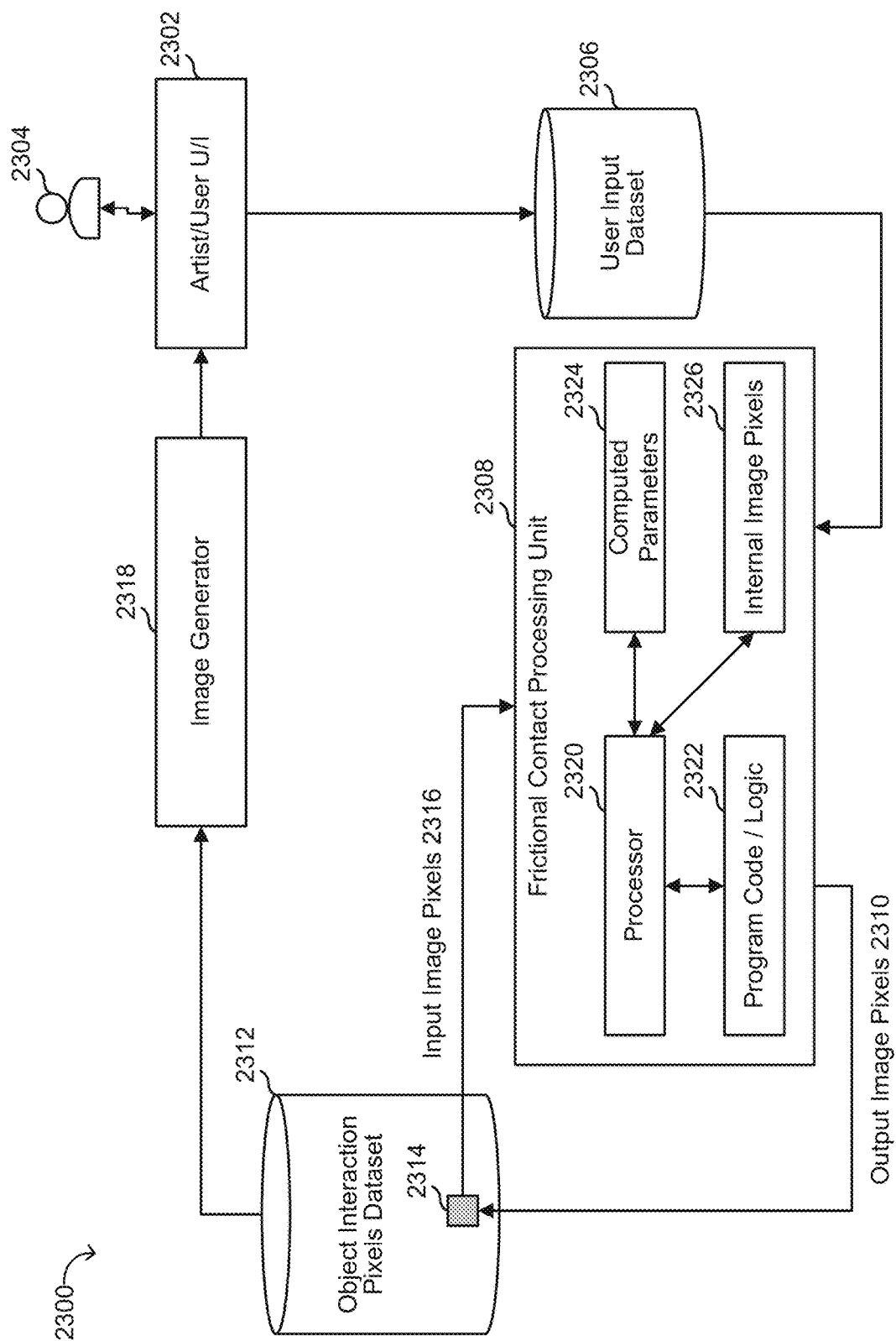
FIG. 23 illustrates an example system of hardware and software components implementing the methods of FIGS. 19 and 20, according to some embodiments of the present disclosure.

FIG. 19 illustrates a method for generating realistic computer-animated interactions between multiple physical bodies having different properties, according to some embodiments of the present disclosure. The method 1900 may be performed by the computer system 2100 of FIG. 21, for example, and/or implemented as shown in FIG. 23.

At step 1902, a computer system obtains the model described above, such as in a computer readable memory. Values for the maximum number of ADMM iterations, the maximum number of Gauss-Seidel operations, warm start velocities, and warm start forces may also be obtained.

At step 1904, the computer system linearizes the model in the form Av=f, where A is a numerical approximation of the hessian of total energy, such as a square matrix of second-order partial derivatives. At step 1906, the computer system detects calculates initial proximities and collisions in the obtained model. At step 1908, the computer system computes the W, the diagonal stiffness matrix of A. At step 1910, the computer system computes the linear solver preconditioner P(A+W).

At step 1912, the computer system conducts a series of ADMM iterations to solve the elastic relaxation problems followed by pure frictional contact projections, until the maximum number of iterations or a condition is reached before the maximum iterations.

Some embodiments of the present disclosure disclose a computer-implemented method comprising receiving a first graphical object and a second graphical object, of a plurality of computer-generated graphical objects contained in a graphical model. The method further comprises receiving a first degree of freedom associated with the first graphical object and a second degree of freedom associated with the second graphical object. The method further comprises detecting a contact point between the first graphical object and the second graphical object in the graphical model. The method further comprises computing a resultant relative velocity between the first graphical object and second graphical object by performing at least one iteration of: (1) computing an updated first relative velocity by minimizing an elastic relaxation energy of the graphical model using a previously computed second velocity and a previously computed error term; (2) computing an updated second relative velocity by minimizing a pure frictional contact projection using the updated first relative velocity and the previously computed error term; and (3) updating the previously computed error term to produce an updated error term. The method further comprises computing, based on at least one of the updated first relative velocity and the updated second relative velocity, the resultant relative velocity.

In some embodiments, the first graphical object and/or the second graphical object comprise tessellated meshes. In some embodiments, the first graphical object and/or the second graphical object comprise tessellated meshes that represent soft bodies. In some embodiments, the pure frictional contact projection computes a frictional displacement based on a normal portion and a tangential portion of the second relative velocity at the contact point. In some embodiments, each graphical object of the plurality of computer-generated graphical objects has associated degrees of freedom including a velocity and a force. In some embodiments, the detecting comprises computing a proximity of the first graphical object and the second graphical object. In some embodiments, the computing the resultant relative velocity includes: assigning the resultant relative velocity a value of the at least one of the updated first relative velocity and the updated second relative velocity from a final iteration of computing the resultant relative velocity.

In some embodiments, the computer-implemented method further comprises linearizing the graphical model to obtain a symmetric operator approximating a square matrix of second-order partial derivatives representing a total energy of the graphical model. Further, the computer-implemented method comprises, from the symmetric operator, computing a diagonal stiffness matrix. The method further comprises computing a linear solver preconditioner based on the diagonal stiffness matrix and the symmetric operator. The method further comprises computing the updated first relative velocity by minimizing the elastic relaxation energy using the linear solver preconditioner. In some embodiments, the updated error term is computed using an alternating directions method of multipliers.

Some embodiments of the present disclosure disclose a non-transitory computer-readable storage medium storing instructions, which when executed by at least one processor of a computer system, causes the computer system to carry out the afore-disclosed computer-implemented method.

Figure 20:
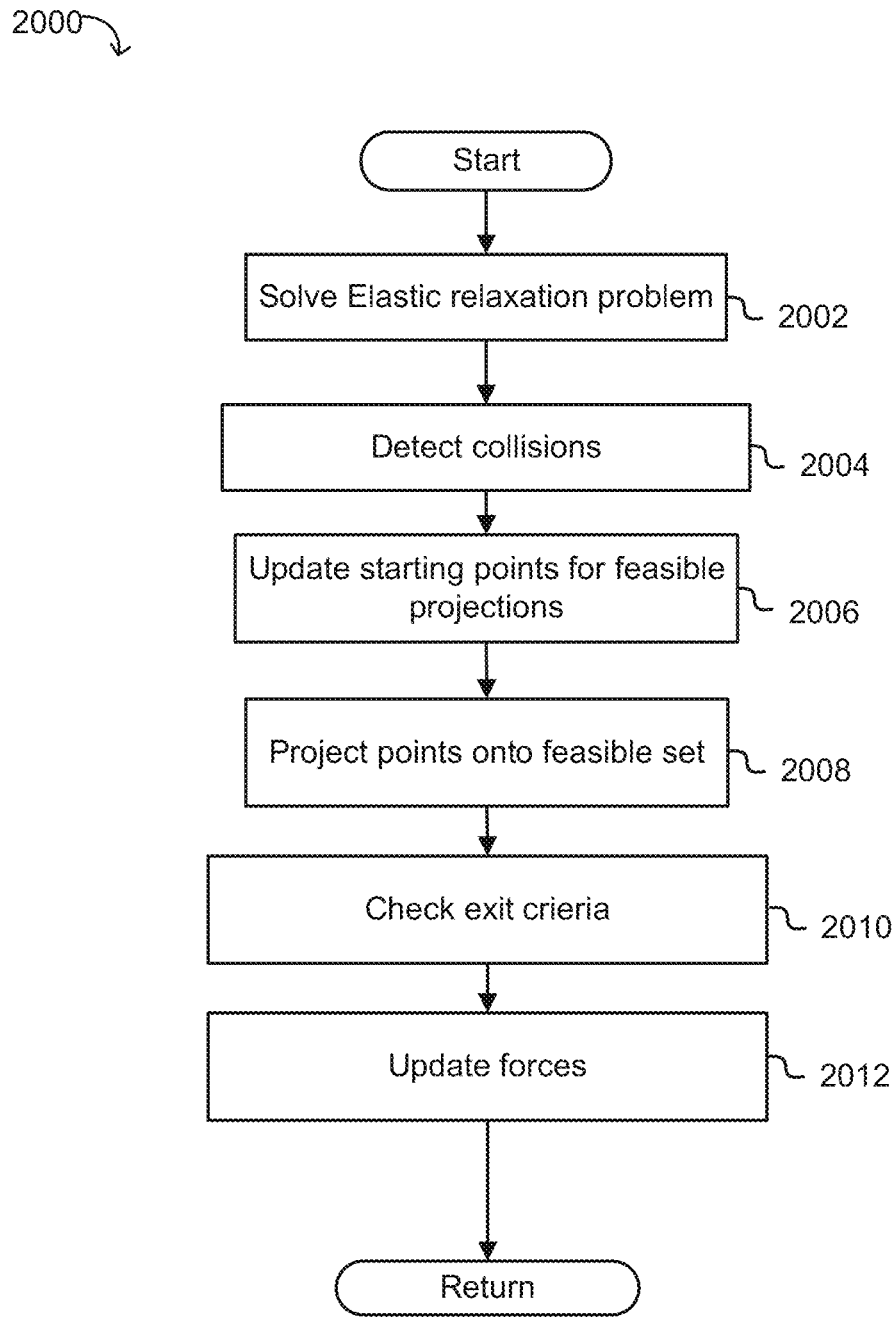
FIG. 20 illustrates an Alternating Directions Method of Multipliers (ADMM) iteration, according to some embodiments of the present disclosure.

FIG. 20 illustrates further details of the ADMM iterations. The method 2000 may be performed by the computer system 2200 of FIG. 22, for example, and/or implemented as shown in FIG. 23. Prior to executing the ADMM iterations, a vector p of velocities, in some embodiments including degrees of freedom, may be initialized.

At step 2002, the computing system solves an elastic relaxation problem.

At step 2004, the computing system detects collisions.

At step 2006, the computing system updates the starting points for the feasible projections.

At step 2008, the computing system projects points p onto the feasible set of valid contact configurations.

At step 2010, the computing system checks exit criteria, such as a maximum number of iterations.

At step 2012, the system updates the forces operating on the system.

Some embodiments of the present disclosure disclose a computer-implemented method, comprising obtaining a model, wherein the model includes degrees of freedom of a plurality of simulated dynamic objects encoded in a plurality of positions in the model. The method further comprises detecting proximity and collisions in the model. The method further comprises linearizing the model to obtain a symmetric operator approximating a square matrix of second-order partial derivatives representing a total energy of the model. Further, the method further comprises, from the symmetric operator, computing a diagonal stiffness matrix. The method further comprises computing a linear solver preconditioner based on the diagonal stiffness matrix and the symmetric operator; and performing at least one iteration of: 1) iteratively updating a first velocity by conducting a first series of iterations to solve an elastic relaxation model; 2) iteratively updating a second velocity by conducting a second series of iterations to solve a pure frictional contact projection; and 3) updating an error term computed from the first velocity and the second velocity. The method further comprises computing, based on at least one of the first velocity and second velocity, a resultant velocity.

In some embodiments, the iteratively updating the first velocity to solve the elastic relaxation model includes: computing an interim velocity using the linear solver preconditioner by solving an elastic relaxation problem based on the symmetric operator, the diagonal stiffness matrix, and a previously computed second velocity; checking an exit criterion including at least a maximum number of iterations; and updating the second velocity based on the interim velocity and the error term. In some embodiments, the exit criterion includes comparing the updated first velocity and the updated second velocity to the first velocity and second velocity, respectively. In some embodiments, the iteratively updating the second velocity to solve the pure frictional contact projection includes: detecting a plurality of contacts in the model; for each contact, computing an interim velocity based on a previously computed first velocity and the error term; for each contact, computing a frictional displacement based on the interim velocity and the diagonal stiffness matrix, producing a plurality of frictional displacements; and applying the plurality of frictional displacements to the pure frictional contact projection to update the second velocity.

Some embodiments of the present disclosure disclose a non-transitory computer-readable storage medium storing instructions, which when executed by at least one processor of a computer system, causes the computer system to carry out the afore-disclosed computer-implemented method.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 21:
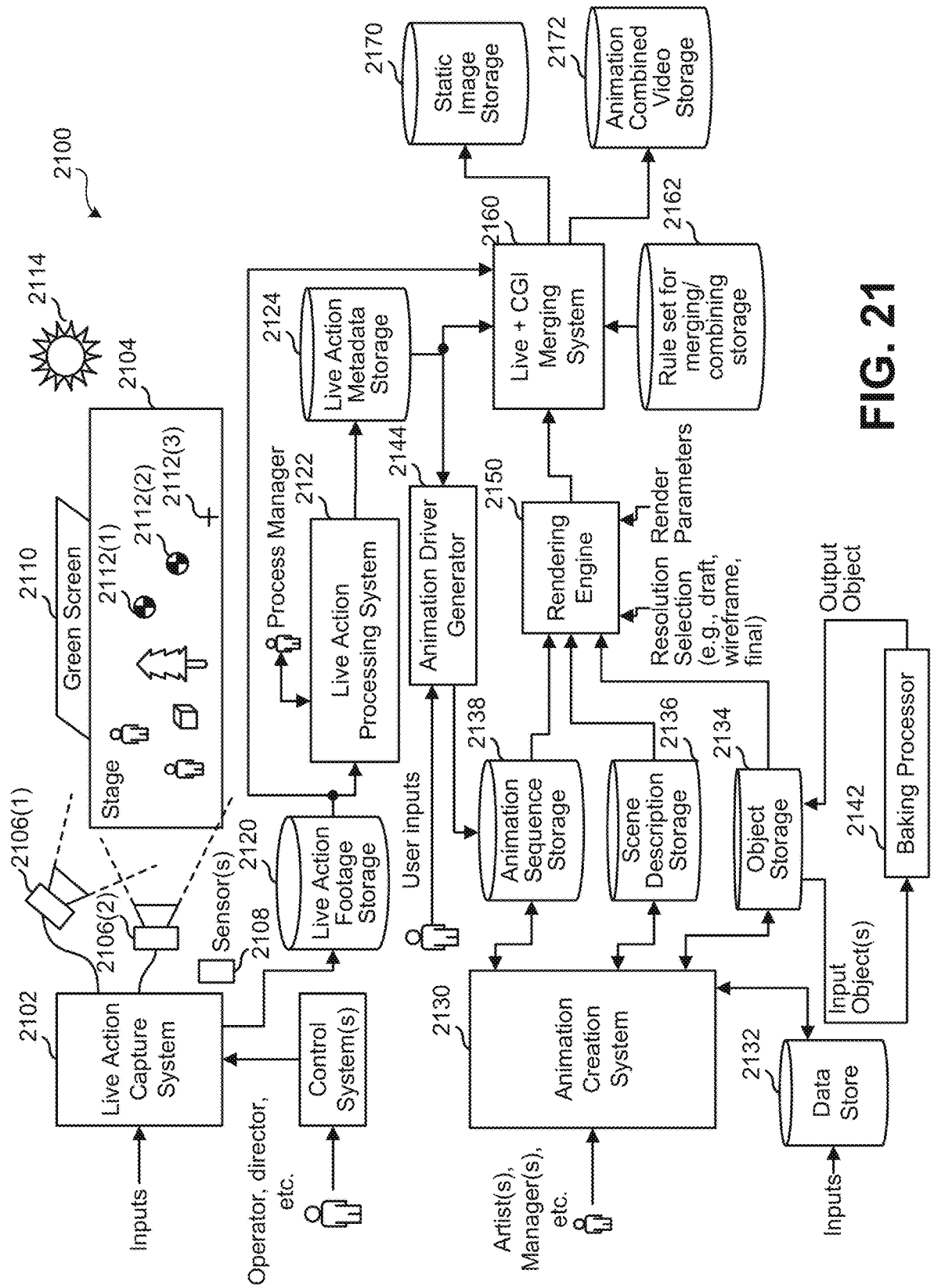
FIG. 21 illustrates an example visual content generation system as might be used to generate imagery in the form of still images and/or video sequences of images, according to various embodiments.

For example, FIG. 21 illustrates the example visual content generation system 2100 as might be used to generate imagery in the form of still images and/or video sequences of images. Visual content generation system 2100 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 2100 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 2100 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 21, a live action capture system 2102 captures a live scene that plays out on a stage 2104. Live action capture system 2102 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 2106(1) and 2106(2) capture the scene, while in some systems, there might be other sensor(s) 2108 that capture information from the live scene (e.g., infrared cameras, infrared sensors, motion capture ("mo-cap") detectors, etc.). On stage 2104, there might be human actors, animal actors, inanimate objects, background objects, and possibly an object such as a green screen 2110 that is designed to be captured in a live scene recording in such a way that it is easily overlaid with computer-generated imagery. Stage 2104 might also contain objects that serve as fiducials, such as fiducials 2112(1)-(3), that might be used post-capture to determine where an object was during capture. A live action scene might be illuminated by one or more lights, such as an overhead light 2114.

During or following the capture of a live action scene, live action capture system 2102 might output live action footage to a live action footage storage 2120. A live action processing system 2122 might process live action footage to generate data about that live action footage and store that data into a live action metadata storage 2124. Live action processing system 2122 might include computer processing capabilities, image processing capabilities, one or more processors, program code storage for storing program instructions executable by the one or more processors, as well as user input devices and user output devices, not all of which are shown. Live action processing system 2122 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 2114, as that might be useful in post-processing to match computer-generated lighting on objects that are computer-generated and overlaid on the live action footage. Live action processing system 2122 might operate autonomously, perhaps based on predetermined program instructions, to generate and output the live action metadata upon receiving and inputting the live action footage. The live action footage can be camera-captured data as well as data from other sensors.

An animation creation system 2130 is another part of visual content generation system 2100. Animation creation system 2130 might include computer processing capabilities, image processing capabilities, one or more processors, program code storage for storing program instructions executable by the one or more processors, as well as user input devices and user output devices, not all of which are shown. Animation creation system 2130 might be used by animation artists, managers, and others to specify details, perhaps programmatically and/or interactively, of imagery to be generated. From user input and data from a database or other data source, indicated as a data store 2132, animation creation system 2130 might generate and output data representing objects (e.g., a horse, a human, a ball, a teapot, a cloud, a light source, a texture, etc.) to an object storage 2134, generate and output data representing a scene into a scene description storage 2136, and/or generate and output data representing animation sequences to an animation sequence storage 2138.

Scene data might indicate locations of objects and other visual elements, values of their parameters, lighting, camera location, camera view plane, and other details that a rendering engine 2150 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 2130 might be interactive, allowing a user to read in animation sequences, scene descriptions, object details, etc. and edit those, possibly returning them to storage to update or replace existing data. As an example, an operator might read in objects from object storage into a baking processor 2142 that would transform those objects into simpler forms and return those to object storage 2134 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 2132 might be used to drive object presentation. For example, if an artist is creating an animation of a spaceship passing over the surface of the Earth, instead of manually drawing or specifying a coastline, the artist might specify that animation creation system 2130 is to read data from data store 2132 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 2144 might read in live action metadata, such as data representing movements and positions of body parts of a live actor during a live action scene. Animation driver generator 2144 might generate corresponding animation parameters to be stored in animation sequence storage 2138 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 2122. Animation driver generator 2144 might convert that movement data into specifications of how joints of an articulated CGI character are to move over time.

A rendering engine 2150 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 2150 might include computer processing capabilities, image processing capabilities, one or more processors, program code storage for storing program instructions executable by the one or more processors, as well as user input devices and user output devices, not all of which are shown.

Visual content generation system 2100 can also include a merging system 2160 that merges live footage with animated content. The live footage might be obtained and input by reading from live action footage storage 2120 to obtain live action footage, by reading from live action metadata storage 2124 to obtain details such as presumed segmentation in captured images segmenting objects in a live action scene from their background (perhaps aided by the fact that green screen 2110 was part of the live action scene), and by obtaining CGI imagery from rendering engine 2150.

A merging system 2160 might also read data from rulesets for merging/combining storage 2162. A very simple example of a rule in a ruleset might be "obtain a full image including a two-dimensional pixel array from live footage, obtain a full image including a two-dimensional pixel array from rendering engine 2150, and output an image where each pixel is a corresponding pixel from rendering engine 2150 when the corresponding pixel in the live footage is a specific color of green, otherwise output a pixel value from the corresponding pixel in the live footage."

Merging system 2160 might include computer processing capabilities, image processing capabilities, one or more processors, program code storage for storing program instructions executable by the one or more processors, as well as user input devices and user output devices, not all of which are shown. Merging system 2160 might operate autonomously, following programming instructions, or might have a user interface or programmatic interface over which an operator can control a merging process. In some embodiments, an operator can specify parameter values to use in a merging process and/or might specify specific tweaks to be made to an output of merging system 2160, such as modifying boundaries of segmented objects, inserting blurs to smooth out imperfections, or adding other effects. Based on its inputs, merging system 2160 can output an image to be stored in a static image storage 2170 and/or a sequence of images in the form of video to be stored in an animated/combined video storage 2172.

Thus, as described, visual content generation system 2100 can be used to generate video that combines live action with computer-generated animation using various components and tools, some of which are described in more detail herein. While visual content generation system 2100 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data that includes image data having shadow details generated using the methods described herein. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 22:
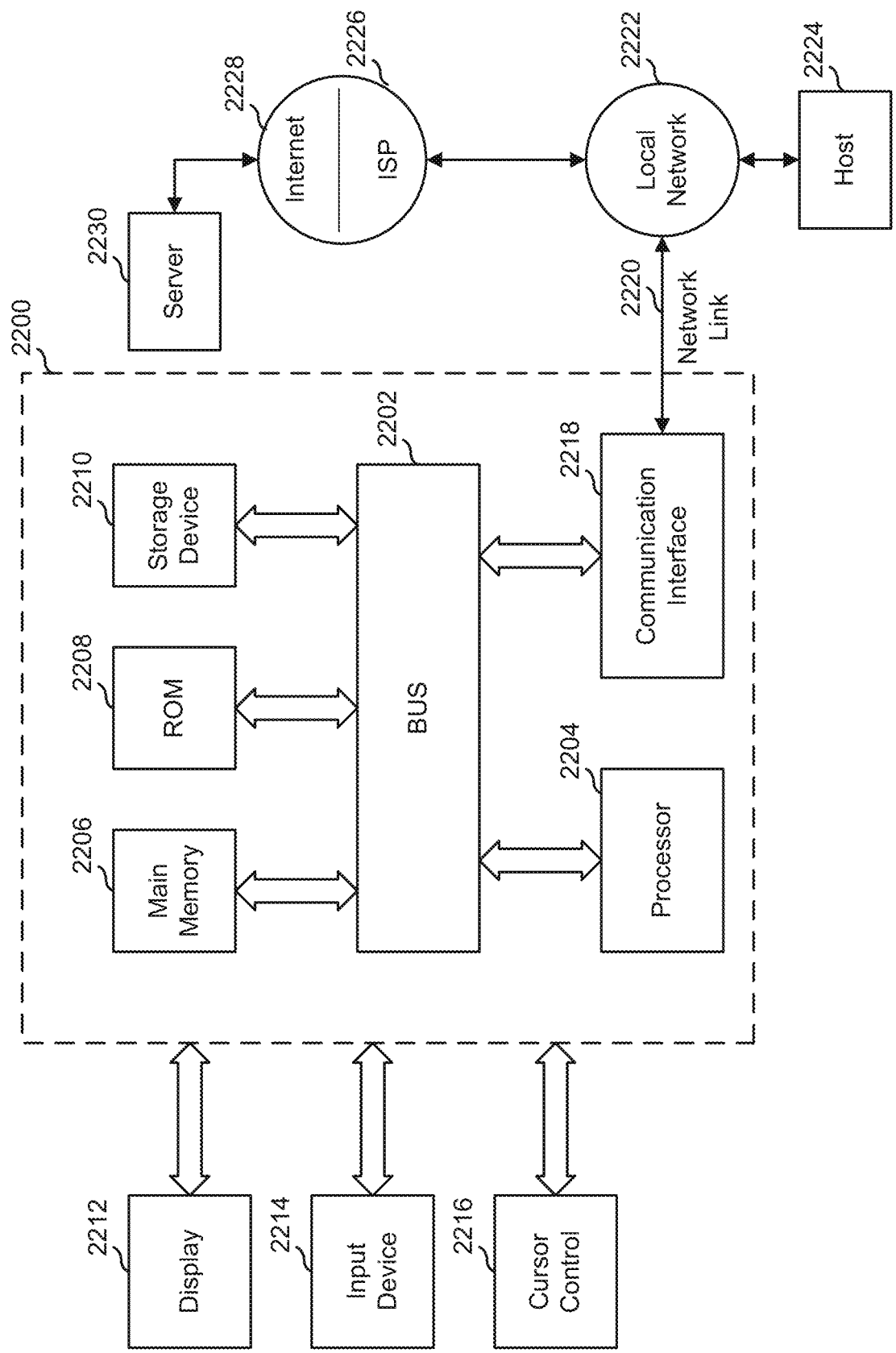
FIG. 22 is a block diagram illustrating an example computer system upon which computer systems of the systems illustrated in FIGS. 1 and 21 may be implemented.

For example, FIG. 22 is a block diagram that illustrates a computer system 2200 upon which the computer systems of the systems described herein and/or visual content generation system 2100 (see FIG. 21) may be implemented. Computer system 2200 includes a bus 2202 or other communication mechanism for communicating information, and a processor 2204 coupled with bus 2202 for processing information. Processor 2204 may be, for example, a general-purpose microprocessor.

Computer system 2200 also includes a main memory 2206, such as a random-access memory (RAM) or other dynamic storage device, coupled to bus 2202 for storing information and instructions to be executed by processor 2204. Main memory 2206 may also be used for storing temporary variables or other intermediate information during execution of instructions to be executed by processor 2204. Such instructions, when stored in non-transitory storage media accessible to processor 2204, render computer system 2200 into a special-purpose machine that is customized to perform the operations specified in the instructions.

Computer system 2200 further includes a read only memory (ROM) 2208 or other static storage device coupled to bus 2202 for storing static information and instructions for processor 2204. A storage device 2210, such as a magnetic disk or optical disk, is provided and coupled to bus 2202 for storing information and instructions.

Computer system 2200 may be coupled via bus 2202 to a display 2212, such as a computer monitor, for displaying information to a computer user. An input device 2214, including alphanumeric and other keys, is coupled to bus 2202 for communicating information and command selections to processor 2204. Another type of user input device is a cursor control 2216, such as a mouse, a trackball, or cursor direction keys for communicating direction information and command selections to processor 2204 and for controlling cursor movement on display 2212. This input device typically has two degrees of freedom in two axes, a first axis (e.g., x) and a second axis (e.g., y), that allows the device to specify positions in a plane.

Computer system 2200 may implement the techniques described herein using customized hard-wired logic, one or more ASICs or FPGAs, firmware and/or program logic which in combination with the computer system causes or programs computer system 2200 to be a special-purpose machine. According to one embodiment, the techniques herein are performed by computer system 2200 in response to processor 2204 executing one or more sequences of one or more instructions contained in main memory 2206. Such instructions may be read into main memory 2206 from another storage medium, such as storage device 2210. Execution of the sequences of instructions contained in main memory 2206 causes processor 2204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 2210. Volatile media includes dynamic memory, such as main memory 2206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 2202. Transmission media can also take the form of acoustic or light waves, such as those generated during radio-wave and infra-red data communications.

Various forms of media may be involved in carrying one or more sequences of one or more instructions to processor 2204 for execution. For example, the instructions may initially be carried on a magnetic disk or solid-state drive of a remote computer. The remote computer can load the instructions into its dynamic memory and send the instructions over a network connection. A modem or network interface local to computer system 2200 can receive the data. Bus 2202 carries the data to main memory 2206, from which processor 2204 retrieves and executes the instructions. The instructions received by main memory 2206 may optionally be stored on storage device 2210 either before or after execution by processor 2204.

Computer system 2200 also includes a communication interface 2218 coupled to bus 2202. Communication interface 2218 provides a two-way data communication coupling to a network link 2220 that is connected to a local network 2222. For example, communication interface 2218 may be a network card, a modem, a cable modem, or a satellite modem to provide a data communication connection to a corresponding type of telephone line or communications line. Wireless links may also be implemented. In any such implementation, communication interface 2218 sends and receives electrical, electromagnetic, or optical signals that carry digital data streams representing various types of information.

Network link 2220 typically provides data communication through one or more networks to other data devices. For example, network link 2220 may provide a connection through local network 2222 to a host computer 2224 or to data equipment operated by an Internet Service Provider (ISP) 2226. ISP 2226 in turn provides data communication services through the world-wide packet data communication network now commonly referred to as the "Internet" 2228. Local network 2222 and Internet 2228 both use electrical, electromagnetic, or optical signals that carry digital data streams. The signals through the various networks and the signals on network link 2220 and through communication interface 2218, which carry the digital data to and from computer system 2200, are example forms of transmission media.

Computer system 2200 can send messages and receive data, including program code, through the network(s), network link 2220, and communication interface 2218. In the Internet example, a server 2230 might transmit a requested code for an application program through the Internet 2228, ISP 2226, local network 2222, and communication interface 2218. The received code may be executed by processor 2204 as it is received, and/or stored in storage device 2210, or other non-volatile storage for later execution.

FIG. 23 illustrates an example system 2300 of hardware and software components implementing the methods of FIGS. 19 and 20, according to some embodiments of the present disclosure. In some embodiments, the system 2300 may include a user/artist user interface (UI) 2302 that is configured to allow an artist/user 2304 to interact with the system 2300. Further, the system 2300 may include an input storage 2306 for storing user input provided by the user/artist 2304 to the system 2300 via the UI 2302, the user input related to physical properties of real-world objects that are represented by graphical objects in a graphical model of the system 2300 used to simulate the interactions of the real-world objects. The system 2300 may also include a frictional contact processing unit 2308 that is configured to receive the user input stored in the input storage 2306 and generate output image pixels 2310 depicting at least portions of the interactions between the graphical objects that are realistic simulations of interactions between the real-world objects. The frictional contact processing unit 2308 may include a processor 2320 that executes program code 2322 to generate the output image pixels 2310 using the user input received from the input storage 2306. The frictional contact processing unit 2308 may have internal storages such as computed parameters storage 2324 and internal image pixels storage 2326. In addition, the system 2300 may include an object interaction pixels dataset 2312 for storing the output image pixels 2310 that are generated by the frictional contact processing unit 2308. In some instances, stored image pixels 2314 stored in the object interaction pixels dataset 2312 may be provided to the frictional contact processing unit 2308 as input image pixels 2316 for further processing, or may be provided to an images generator 2318 of the system 2300 so that the image generator 2318 may generate an image that may be presented to the user 2304 via the UI 2302.

In some embodiments, an artist/user 2304 may be simulating the interactions of real-world objects that have different physical properties such as but not limited to elasticity, density, flexibility, Young's moduli, etc. For example, the artist/user 2304 may be producing an animation that includes a person running and may wish to simulate in as realistic manner as possible the interaction between the person's hair with the cloth or the muscle of the person, the hair and the cloth or the muscle having different physical properties such as elasticity, density, etc. In such cases, the artist/user 2302 may provide a user input for storage in the user input database 2306, the user input including but not limited to physical parameters of the real-world objects such as size (e.g., thickness/diameter), density, mass, bending/stretching moduli, Poisson ratio, friction coefficient, elastic damping, etc. In some embodiments, the user input may also include non-physical parameters for use in the computations by the frictional contact processing unit, such as but not limited to fixed number of Projected Newton iterations, maximum number of ADMM iterations, fixed number of Gauss-Seidel iterations, infinity-norm ADMM tolerance, linear solver tolerance, parameters for building diagonal approximation, etc.

In some embodiments, the frictional contact processing unit 2308 may receive such user input from the user input dataset 2306 and generate output image pixels 2310 that contain or depict a realistic simulation of the interactions between the real-world or physical objects. For instance, the program code 2322 may include instructions implementing the methods of FIG. 19 and/or FIG. 20, and the processor 2320 may execute the program code 2322 to generate the output image pixels 2310. In some cases, the frictional contact processing unit 2308 may receive, instead of or in addition to the user input from the user input dataset 2306, stored image pixels 2314 from the object interaction pixels dataset 2312 as input image pixels 2316 for further processing and generating the output image pixels 2310. For example, the artist/user 2304, after inspecting, via the UI 2302, an image generated by the image generator 2318, may wish to make changes or improvements to the image, and may communicate the same to the system 2300 (e.g., by providing an updated user input to the user input dataset 2306). In such cases, a stored image pixels 2314 corresponding to the image inspected by the artist/user 2304 may be provided to the frictional contact processing unit 2308 as an input image pixels 2316 for further processing so that the frictional contact processing unit 2308 may generate an updated/improved output image pixels 2310 to be stored in the object interaction pixels dataset 2312. In some instances, the image pixels stored in the object interaction pixels dataset 2312 may be processed by the image generator 2318 to generate simulation images (e.g., such as those shown in FIGS. 10-15) that may be presented to the artist/user 2304 via the UI 2302.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a representation of a plurality of virtual objects of a model, the plurality of virtual objects comprising a first interacting object and a second interacting object;
   receiving a first degree of freedom associated with the first interacting object;
   receiving a second degree of freedom associated with the second interacting object;
   computing an initial condition using the first degree of freedom and second degree of freedom;
   detecting, using the initial condition, a set of contact points between the first interacting object and the second interacting object, the set of contact points comprising one or more contact points;
   computing a resultant relative velocity between the first interacting object and second interacting object, given the first degree of freedom and the second degree of freedom by performing at least one iteration of:
   (1) computing an updated first relative velocity by minimizing an elastic relaxation energy of the model using a previously computed second velocity and a previously computed error term;
   (2) computing an updated second relative velocity by minimizing a frictional contact projection using the set of contact points and the updated first relative velocity and the previously computed error term; and
   (3) updating the previously computed error term to produce an updated error term; and
   computing the resultant relative velocity based on at least one of the updated first relative velocity and the updated second relative velocity.

2. The computer-implemented method of claim 1, wherein the first interacting object and/or the second interacting object comprise tessellated meshes.

3. The method of claim 1, wherein the first interacting object and/or the second interacting object represent soft bodies.

4. The method of claim 1, wherein the first interacting object and the second interacting object are portions of a larger object.

5. The computer-implemented method of claim 1, wherein the frictional contact projection corresponds to a frictional displacement based on a normal portion and a tangential portion of the updated second relative velocity at the one or more contact points.

6. The computer-implemented method of claim 1, wherein an interacting object of the plurality of virtual objects has associated degrees of freedom including a velocity and a force.

7. The computer-implemented method of claim 1, wherein detecting the set of contact points comprises computing a proximity of the first interacting object and the second interacting object.

8. The computer-implemented method of claim 1, wherein computing the resultant relative velocity comprises assigning the resultant relative velocity a value of the at least one of the updated first relative velocity and the updated second relative velocity from a final iteration of computing the resultant relative velocity.

9. The computer-implemented method of claim 1, further comprising:
linearizing the model to obtain a symmetric operator approximating a square matrix of second-order partial derivatives representing a total energy of the model;
from the symmetric operator, computing a diagonal stiffness matrix;
computing a linear solver preconditioner based on the diagonal stiffness matrix and the symmetric operator; and
computing the updated first relative velocity by minimizing the elastic relaxation energy using the linear solver preconditioner.

10. The computer-implemented method of claim 1, wherein the updated error term is computed using an alternating directions method of multipliers.

11. A non-transitory computer-readable storage medium storing instructions, which when executed by at least one processor of a computer system, causes the computer system to carry out the computer-implemented method of claim 1.

12. A computer-implemented method, comprising:
obtaining a model, wherein the model includes degrees of freedom of a plurality of simulated dynamic objects encoded in a plurality of positions in the model;
detecting proximity and collisions in the model;
linearizing the model to obtain a symmetric operator approximating a square matrix of second-order partial derivatives representing a total energy of the model;
from the symmetric operator, computing a diagonal stiffness matrix;
computing a linear solver preconditioner based on the diagonal stiffness matrix and the symmetric operator; and
performing at least one iteration of:
1) iteratively updating a first velocity by conducting a first series of iterations to solve an elastic relaxation model to form an updated first velocity;
2) iteratively updating a second velocity by conducting a second series of iterations to solve a frictional contact projection to form an updated second velocity; and
3) updating an error term computed from the first velocity and the second velocity; and
computing, based on at least one of the first velocity and second velocity, a resultant velocity.

13. The computer-implemented method of claim 12, wherein iteratively updating the first velocity to solve the elastic relaxation model comprises:
determining an exit criterion;
concluding iterations of updating if the exit criterion is met;
computing an interim velocity using the linear solver preconditioner by solving an elastic relaxation problem based on the symmetric operator, the diagonal stiffness matrix, and a previously computed second velocity; and
updating the second velocity to the updated second velocity based on the interim velocity and the error term.

14. The computer-implemented method of claim 13, wherein the exit criterion corresponds to a number of iterations being equal to or greater than a predetermined maximum number of iterations.

15. The computer-implemented method of claim 13, wherein the exit criterion corresponds to the updated first velocity being approximately equal to the first velocity and the updated second velocity being approximately equal to the second velocity.

16. The computer-implemented method of claim 13, wherein iteratively updating the second velocity to solve the frictional contact projection comprises:
detecting a plurality of contacts in the model;
for a given contact of the plurality of contacts, computing the interim velocity based on a previously computed first velocity and the error term;
for the given contact, computing a frictional displacement based on the interim velocity and the diagonal stiffness matrix, producing a plurality of frictional displacements; and
applying the plurality of frictional displacements to the frictional contact projection to update the second velocity.

17. A non-transitory computer-readable storage medium storing instructions, which when executed by at least one processor of a computer system, causes the computer system to carry out the computer-implemented method of claim 12.

* * * * *

UNITED STATES PATENT AND TRADEMARK OFFICE
CERTIFICATE OF CORRECTION

PATENT NO. : 11,210,833 B1
APPLICATION NO. : 17/186705
DATED : December 28, 2021
INVENTOR(S) : Gilles Daviet It is certified that error appears in the above-identified patent and that said Letters Patent is hereby corrected as shown below:

In the Specification

Column 10, Line 31, Equation A1, change "$h_c(t)=\sum_{j\in J_c} b_{c,j} q_j(t) \underline{h}_c(t)$" to --$h_c(t)=\sum_{j\in J_c} b_{c,j} q_j(t)+\underline{h}_c(t)$--.

Column 11, Line 1, change "so mat a relative velocity" to --so that a relative velocity--.

Column 11, Line 3, Equation A3, change "$u=\sum_{j\in J} b_{c,j} v_j k,$" to --$u=\sum_{j\in J} b_{c,j} v_j + k,$--.

Column 11, Line 36, Equation M1, change "$(q,v,t+\Delta_r)$" to --$(q,v,t+\Delta_t)$--.

Column 12, Line 38, change "complement as" to --complementarity as--.

Column 17, Line 6, change "$\delta \leftarrow \|v^l - v^{l-1}\|_\infty + \|v^l|p\|_\infty$" to --$\delta \leftarrow \|v^l - v^{l-1}\|_\infty + \|v^l - p\|_\infty$--.

Column 18, Line 54, change "the expression $w_j$:max min $(\sigma\eta_j, \eta_j)))$." to --the expression $w_j:=\max(\sigma\eta_j, \min(\beta m_j, \eta_j)))$.--.

Column 19, Line 18, change "negative normal force at each contact" to --negative normal force $-\xi_c n_c$ at each contact--.

Column 25, Line 58, change "iterations; NAD: maximum number of ADMM iterations;" to --iterations; $N_{ADMM}$: maximum number of ADMM iterations;--.

Column 27, Line 53, "which is also satisfies the Coulomb condition." to --which also satisfies the Coulomb condition.--.

Signed and Sealed this
Eighth Day of October, 2024

*Katherine Kelly Vidal*
Katherine Kelly Vidal
*Director of the United States Patent and Trademark Office*